United States Patent
Matos

(10) Patent No.: US 8,429,890 B2
(45) Date of Patent: Apr. 30, 2013

(54) BIRD AND DEBRIS DEFLECTOR FOR AIRCRAFT JET ENGINES

(76) Inventor: Jeffrey A. Matos, New Rochelle, NY (US)

( * ) Notice: Subject to any disclaimer, the term of this patent is extended or adjusted under 35 U.S.C. 154(b) by 747 days.

(21) Appl. No.: 12/689,554

(22) Filed: Jan. 19, 2010

(65) Prior Publication Data
US 2010/0180566 A1 Jul. 22, 2010

Related U.S. Application Data

(60) Provisional application No. 61/205,381, filed on Jan. 16, 2009, provisional application No. 61/205,785, filed on Jan. 22, 2009.

(51) Int. Cl.
*F02G 3/00* (2006.01)
*B64D 33/02* (2006.01)
*B01D 39/00* (2006.01)

(52) U.S. Cl.
USPC ........ 60/39.092; 244/53 B; 55/306; 137/15.1; 137/15.2

(58) Field of Classification Search ............... 60/39.092; 244/53 B; 55/306; 137/15.1, 15.2
See application file for complete search history.

(56) References Cited

U.S. PATENT DOCUMENTS

| | | | |
|---|---|---|---|
| 3,426,981 A * | 2/1969 | Allcock | 244/1 R |
| 4,137,535 A | 1/1979 | Rupprecht | |
| 4,354,346 A | 10/1982 | Wooding | |
| 5,102,375 A | 4/1992 | Featherstone | |
| 5,139,464 A | 8/1992 | Lehnert | |
| 5,385,612 A | 1/1995 | Li | |
| D433,029 S | 10/2000 | Eidson | |

* cited by examiner

*Primary Examiner* — Phutthiwat Wongwian
*Assistant Examiner* — Karthik Subramanian
(74) *Attorney, Agent, or Firm* — Eckert Seamans Cherin & Mellott, LLC

(57) ABSTRACT

A retractable deflector to deflect birds and debris from an air intake duct of an aircraft jet engine. The duct has a central longitudinal axis and a forward opening for air receipt. The deflector includes a plurality of elongate first support members disposed on the duct having leading ends which extend from a perimeter of the opening, mounted for movement to extend and retract the leading ends. A second support member is coupled to these leading ends to retain them in spaced relation. The second support member is extendible in length and configured to hold the leading ends of the first support members sufficiently close together to cause the first support members to deflect at least one of a bird and debris when deployed, and to allow the leading ends to maintain a spaced-apart relation along a line which approximately corresponds to the perimeter of the duct when retracted.

26 Claims, 29 Drawing Sheets

BIRD AND DEBRIS DEFLECTOR FOR AIRCRAFT JET ENGINES

CROSS REFERENCE TO RELATED APPLICATIONS

The subject matter of this application is related to, and claims priority from, the following provisional applications:
1) Provisional Application No. 61/205,381 filed Jan. 16, 2009, and
2) Provisional Application No. 61/205,785 filed Jan. 22, 2009.

BACKGROUND OF THE INVENTION

Large sized debris which enters the intake of a jet engine may have disastrous consequences, including engine damage, functional engine destruction, and, if all or most engines become non-functional, emergency termination of a flight. This is what occurred on Jan. 15, 2009 with a flight out of LaGuardia Airport which made an emergency landing in the Hudson River after both of its engines failed: The source of damage was a flock of birds some of which entered the air intake of the engines, and rendered both engines non-functional.

U.S. Pat. No. 4,354,346 to Wooding discloses an intake duct for a jet engine which is not retractable. The engine intake extension of the invention is long and expected to be aerodynamically very demanding.

U.S. Design Pat. No. 433,029 to Eidson comprises an non-retractable cowl. Because it is non-retractable, it will exert aerodynamic inefficiencies throughout a flight.

U.S. Pat. No. 5,385,612 to Li discloses a cleaning system which is intended to be useful for jet engine intake. However, the device is not retractable, and is not able to provide jet air intake without very substantial aerodynamic limitation.

U.S. Pat. Nos. 4,137,535; 5,102,375 and 5,139,464 all relate to mechanisms for extending a telescoping antenna.

The subject matter of these prior U.S. patents is incorporated herein by reference.

The invention herein discusses methods and apparatus for preventing birds and other debris from doing damage to a jet engine using a deployable/retractable apparatus with acceptable aerodynamic features.

SUMMARY OF THE INVENTION

It is a principal object of the present invention to provide protection to an operating jet engine against airborne birds and other debris which may damage the engine.

It is a further object of the present invention to provide such protection using retractable apparatus, so that the aerodynamic consequences of such an apparatus are minimized, with respect to duration of use.

The invention herein discusses methods and apparatus for preventing birds and other debris from damaging a jet engine. It entails the deployment of a radially distributed set of first elements in front of the engine air intake. During the process of deployment, the leading edges of these first elements converge as they are extended from the engine housing. In order to prevent these first elements from suffering damage or mal-positioning due to air turbulence, a second element, oriented transverse to the first elements, and positioned at the leading edge of the first elements, is also deployed. The second element features an adjustable circumference, allowing it to maintain the leading edges during the process of deployment, with the circumference changing as the length of the deployed portion of the first element changes.

The first elements are retractable into the housing of the engine, so that once the aircraft rises above the altitude where such a strike may occur, better aerodynamic performance may be attained. During the landing phase of the flight, the first elements may be re-deployed when the aircraft has descended to an altitude where such protection is need. The There are a variety of possible first element configurations involving variations in (a) the shape of the first element (straight and curved), (b) the number of first elements, and (c) the structural details of the first elements (for example: rigid rod terminating in eyelet, rigid rod terminating in tubular structure, hollow rod terminating in T-shaped tubular structure, and cable terminating in eyelet).

There are a variety of possible second element configurations involving variations in (a) the quality of the second element material (elastic, spring, cable), and (b) the number of second elements.

In one preferred embodiment of the invention, electromagnetic coupling secures adjacent leading edges of first elements in the fully deployed state.

In another preferred embodiment, de-icing apparatus warms the first and/or second elements.

In yet another preferred embodiment, the entire deflector apparatus rotates about the longitudinal axis, to provide additional protection.

DETAILED DESCRIPTION OF THE PREFERRED EMBODIMENTS

Figure 1A:
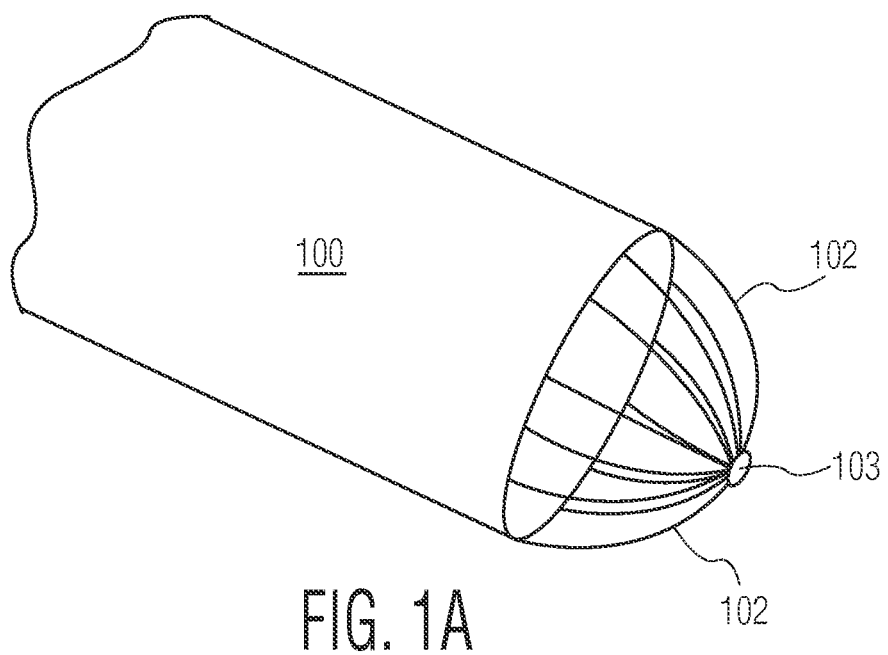
FIG. 1A is a perspective view of a jet engine with a deployed deflector apparatus having multiple curved first elements and a single transverse second element.
Figure 1B:
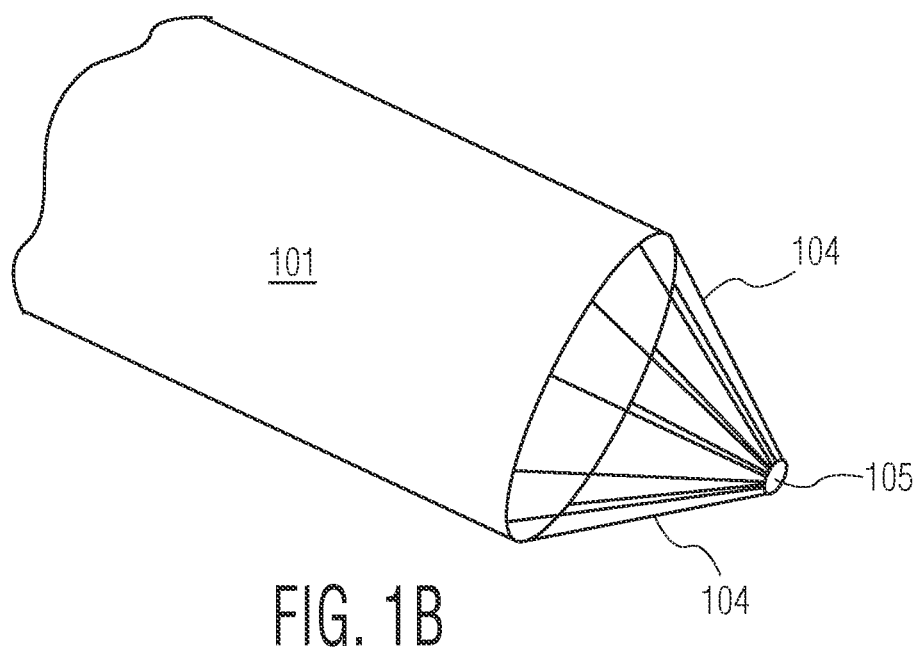
FIG. 1B is a perspective view of a jet engine with a deployed deflector apparatus having multiple straight first elements and a single transverse second element.

FIGS. 1A and 1B show two types of deflector apparatus for a jet engine. FIG. 1A shows 12 curved first elements 102 projecting from the air intake end of jet engine 100. FIG. 1B shows 11 straight first elements 104 projecting from the air intake end of jet engine 101. Many other configurations are possible. Both figures show first elements in a radially symmetric distribution. Configurations with a greater or lesser number of first elements are possible.

To stabilize the first elements during deployment, a second expandable element connects the leading end of the first elements, shown as 103 in FIG. 1A and 105 in FIG. 1B.

Embodiments of the invention in which the first elements link at a point or a small area without an aperture (i.e. an opening at the most forward point) are possible. Embodiments of the invention in which the circular apparatus is substituted by an apparatus of another shape are possible. Elliptical shapes, hexagonal shapes, octagonal shapes, polygonal shapes (and any shape in which the number of sides to the central aperture is equal to the number of first elements) are possible. A shape which is identical to that of the engine housing, if not circular, is possible.

Figure 1C:
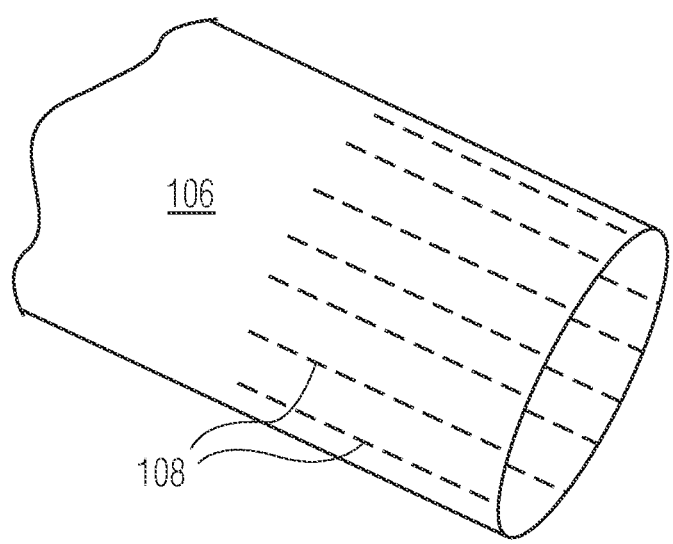
FIG. 1C is a representational diagram of a jet engine indicating the storage of retracted first elements and a retracted second element.

FIG. 1C shows the first elements 108 in the fully retracted position (indicated in the figure as broken lines) within the housing of engine 106. In the embodiment shown in FIG. 1C, the first elements in the retracted state are stored inside the engine housing, and are not telescoped. The configuration shown in FIG. 1C would be suitable for straight first elements, and could also be used for curved first elements with a large radius of curvature. Curved first elements with a smaller radius of curvature (i.e. approximately the same radius of curvature as the engine housing) could be stored by rotating them 90 degrees so that they would, in the stored state, lie along the circumference of the engine.

Figure 1D:
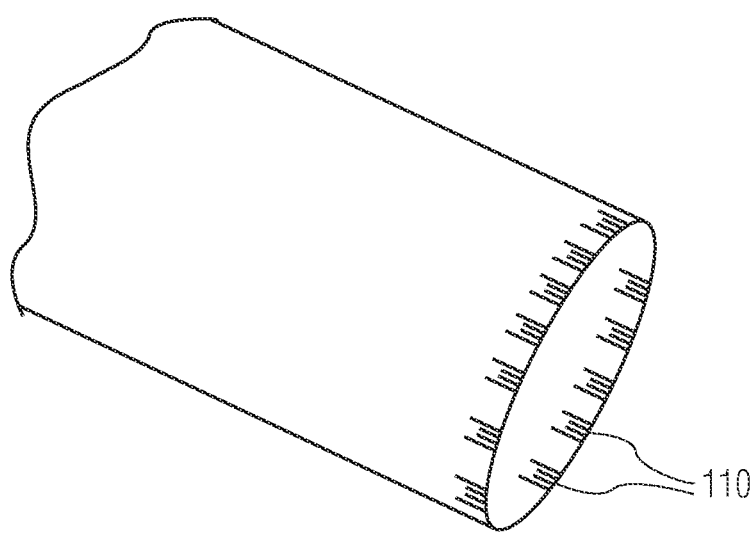
FIG. 1D is a representational diagram of a jet engine indicating the storage of telescoping first elements.

FIG. 1D shows the storage of telescoped first elements 110. The advantage of telescoping is ease of storage in the retracted state. The telescoped configuration for the retracted state shown in FIG. 1D could also accommodate curved first elements (e.g. as shown in FIGS. 3A and 3B) with a smaller radius of curvature (without having to rotate 90 degrees for storage) than that of the engine housing of FIG. 1C.

Figure 1E:
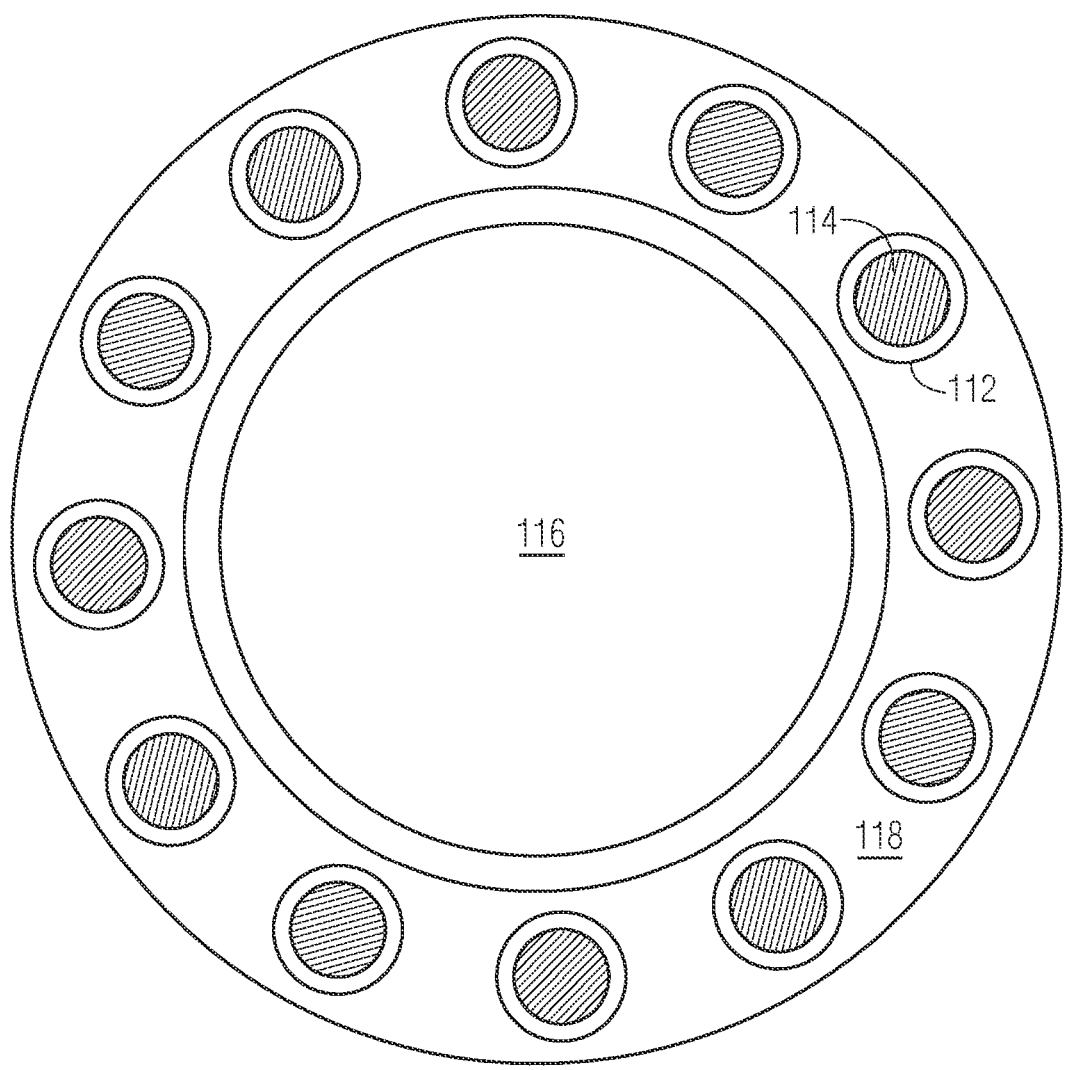
FIG. 1E is a front view of the placement of first elements within an engine housing.

FIG. 1E shows a front view of telescoped first elements 114 within compartments 112, situated in engine housing 118. The engine apparatus is situated centrally, in the location indicated by 116.

Figure 2A:
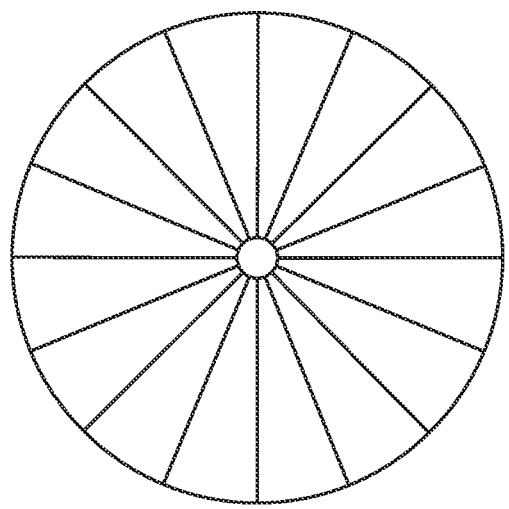
FIG. 2A is a representational diagram showing a front view of a fully deployed deflector apparatus with 16 first elements arrayed in a radially symmetric configuration, and a second element.
Figure 2B:
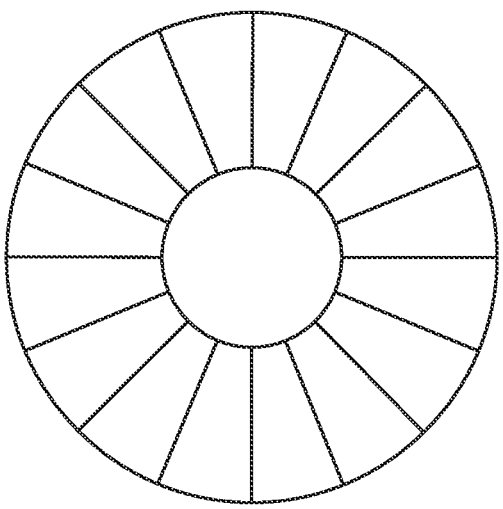
FIG. 2B is a representational diagram showing a front view of a partially deployed deflector apparatus with 16 first elements arrayed in a radially symmetric configuration, and a second element.
Figure 2C:
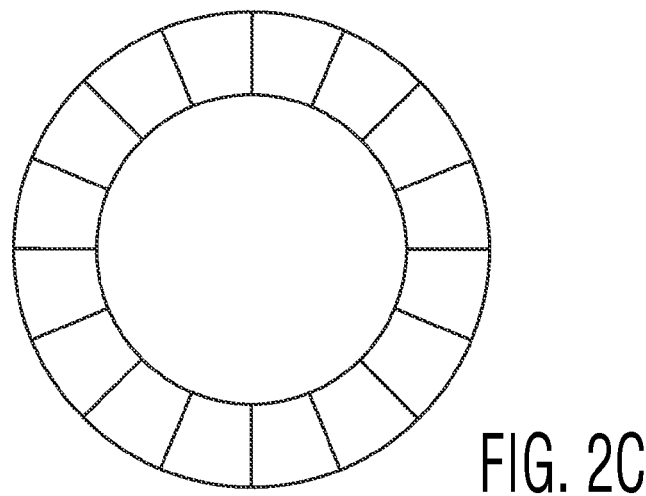
FIG. 2C is a representational diagram showing another front view of a partially deployed deflector apparatus with 16 first elements arrayed in a radially symmetric configuration, and a second element, showing a lesser degree of deployment than that shown in FIG. 2B.
Figure 2D:
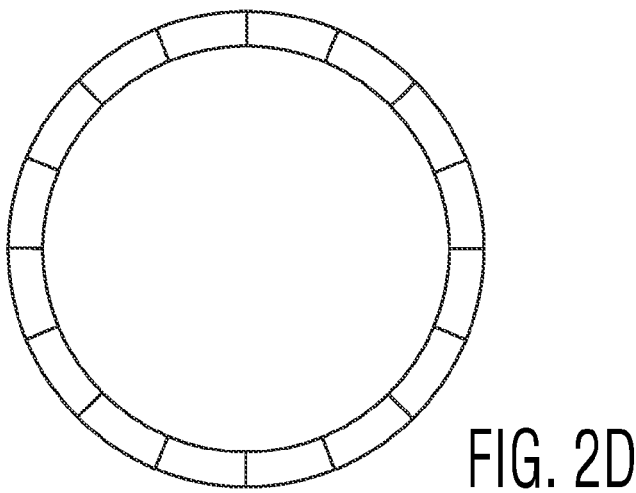
FIG. 2D is a representational diagram showing another front view of a partially deployed deflector apparatus with 16 first elements arrayed in a radially symmetric configuration, and a second element, showing a lesser degree of deployment than that shown in FIG. 2C.
Figure 2E:
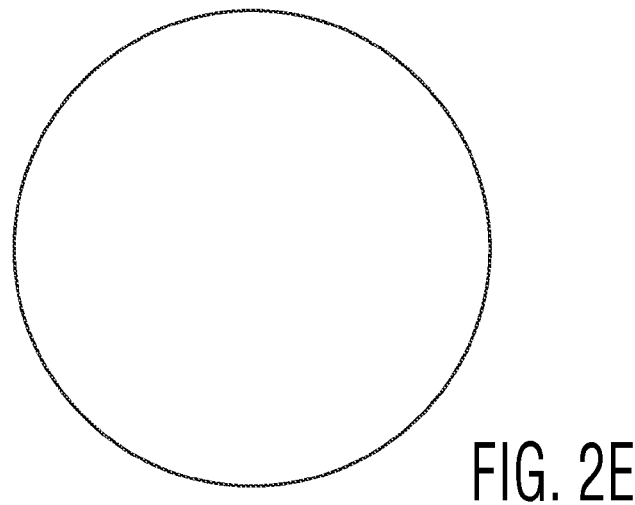
FIG. 2E is a representational diagram showing a front view of the deflector apparatus of FIG. 2D in a fully retracted state.

FIGS. 2A through 2E show front views of an engine with the first elements joined at the leading edge by a circular second element. During the deflector retraction process, the circular second element increases in circumference as shown in the sequence of FIGS. 2A to 2E. FIG. 2E shows the fully retracted state—where most or all of the first element apparatus has been withdrawn into the engine housing, as the radius of what was the central circular element is increased to the point that it equals approximately that of the engine housing. A 16 first element configuration is shown; configurations with fewer and larger numbers of first elements are possible.

Figure 3A:
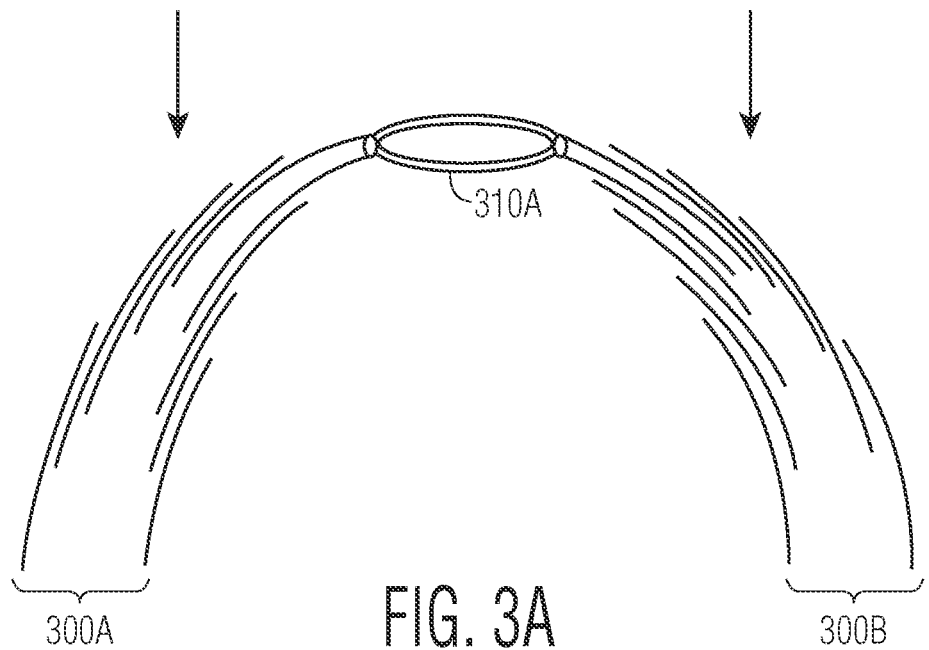
FIG. 3A shows a representational cross sectional diagram of a deflector apparatus with curved, telescoping first elements, and a second element, in a deployed position.
Figure 3B:
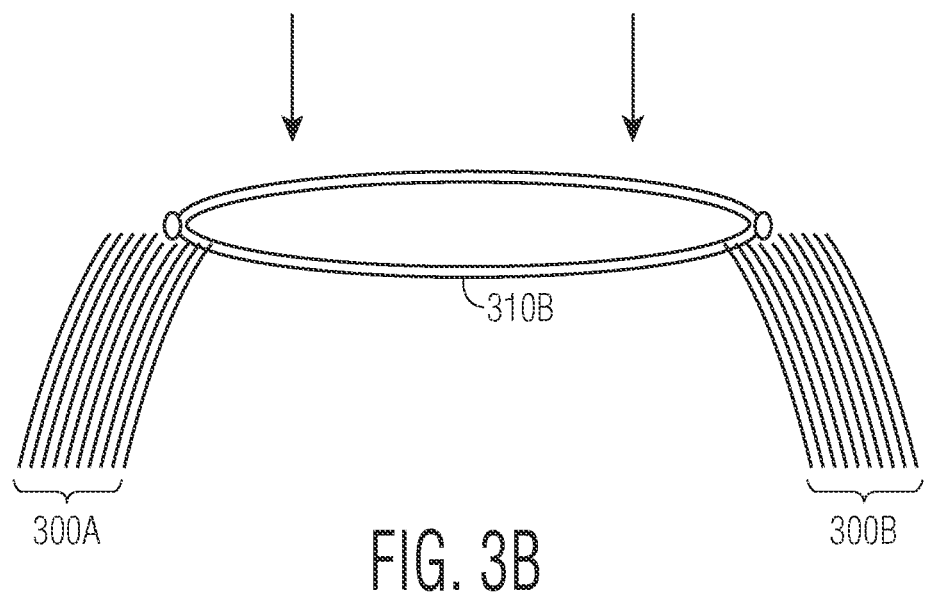
FIG. 3B shows a representational cross sectional diagram of a deflector apparatus with curved, telescoping first elements, and a second element, in a retracted position.

FIGS. 3 and 4 show a side view of an embodiment of the apparatus, emphasizing a first element structure with a telescoping configuration. FIG. 3 shows an apparatus with curved first elements, and FIG. 4 shows an apparatus with straight first elements. Each figure shows that the first element structure consists of a series of cylindrical elements with a telescoping structure, much like a retractable automobile antenna. FIG. 3A shows the first elements 300A fully extended, with circular stabilizing apparatus 310A assuming a minimal circumference. In the fully retracted state shown in FIG. 3B, the telescoping of concentric cylindrical first elements 300B allows the first elements to fit inside the engine housing, while the circular apparatus 310B expands (in a process described hereinbelow) so that it may also fit into the engine housing. Only two sets of first elements are shown for simplicity. Configurations with more sets of first elements are desirable to allow for greater stability and ease of retraction. Arrows above FIGS. 3A and 3B show the direction of air flow into the engine. Electrically controllable telescoping elements which are controlled by one or more electric motors, by hydraulic apparatus and by pneumatic apparatus are known.

Figure 4A:
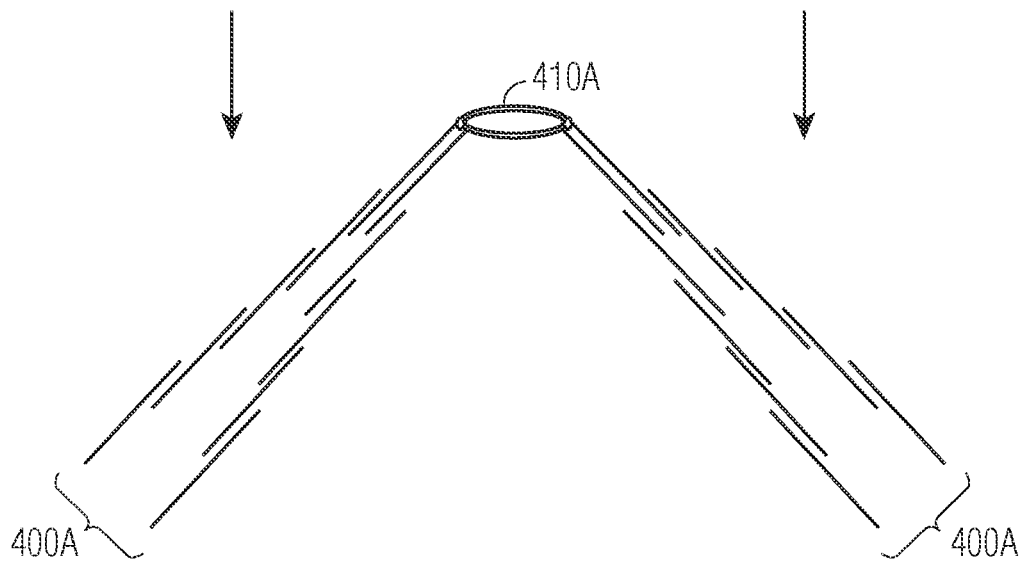
FIG. 4A shows a representational cross sectional diagram of a deflector apparatus with straight, telescoping first elements, and a second element, in a deployed position.
Figure 4B:
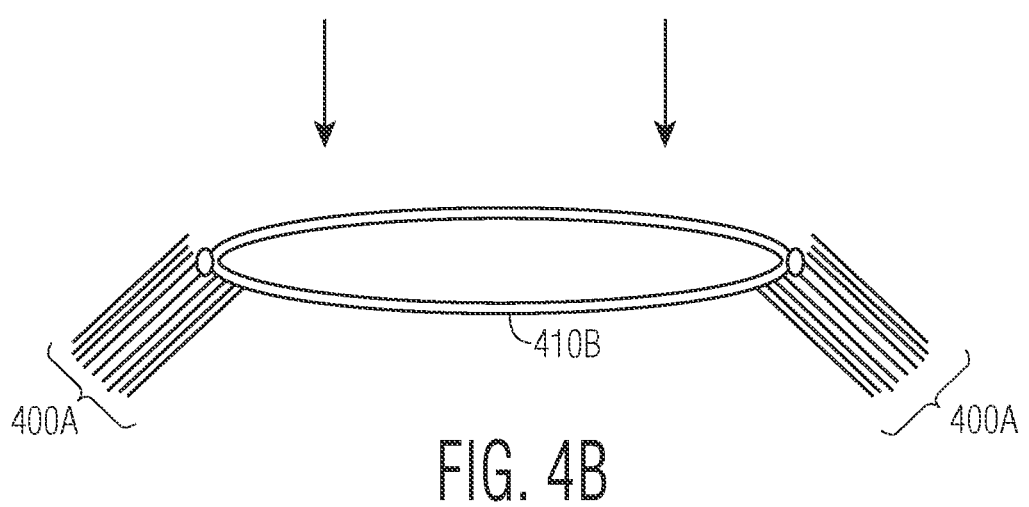
FIG. 4B shows a representational cross sectional diagram of a deflector apparatus with straight, telescoping first elements, and a second element, in a retracted position.

FIG. 4A shows the first elements 400A fully extended, with circular stabilizing apparatus 410A assuming a minimal circumference. In the fully retracted state shown in FIG. 4B, the telescoping of concentric cylindrical first elements 400B allows the first elements to fit inside the engine housing, while the circular apparatus 410B expands (in a process described hereinbelow) so that it may also fit into the engine housing. Only two sets of first elements are shown for simplicity. Configurations with more sets of first elements are desirable to allow for greater stability and ease of retraction. Arrows above FIGS. 4A and 4B show the direction of air flow into the engine.

Figure 5A:
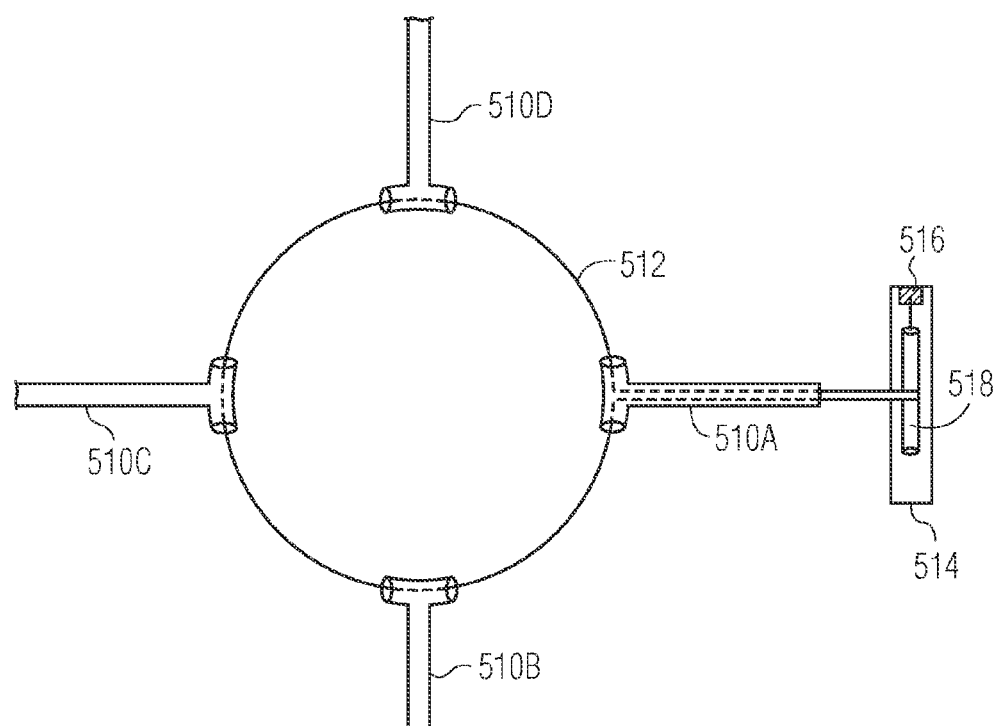
FIG. 5A shows a representation diagram of a deflector apparatus with four first elements, a second cable element, and a single winch for adjusting the length of the cable.
Figure 5B:
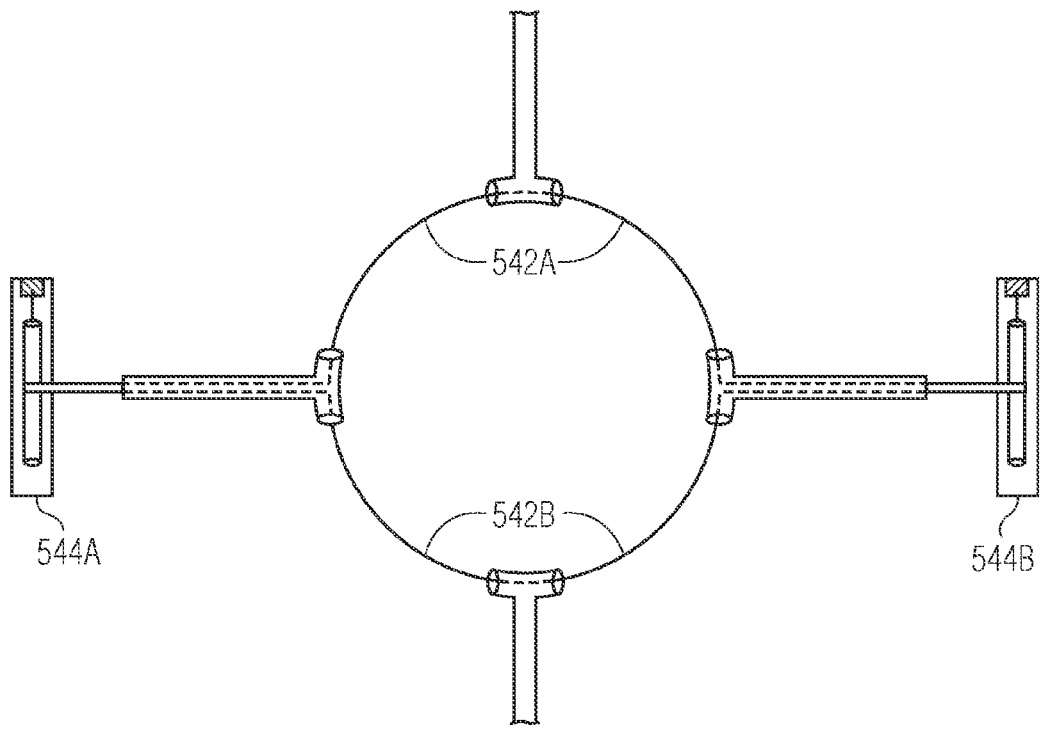
FIG. 5B shows a representation diagram of a deflector apparatus with four first elements, two second cable elements, and two winches for adjusting the length of the cables.
Figure 5C:
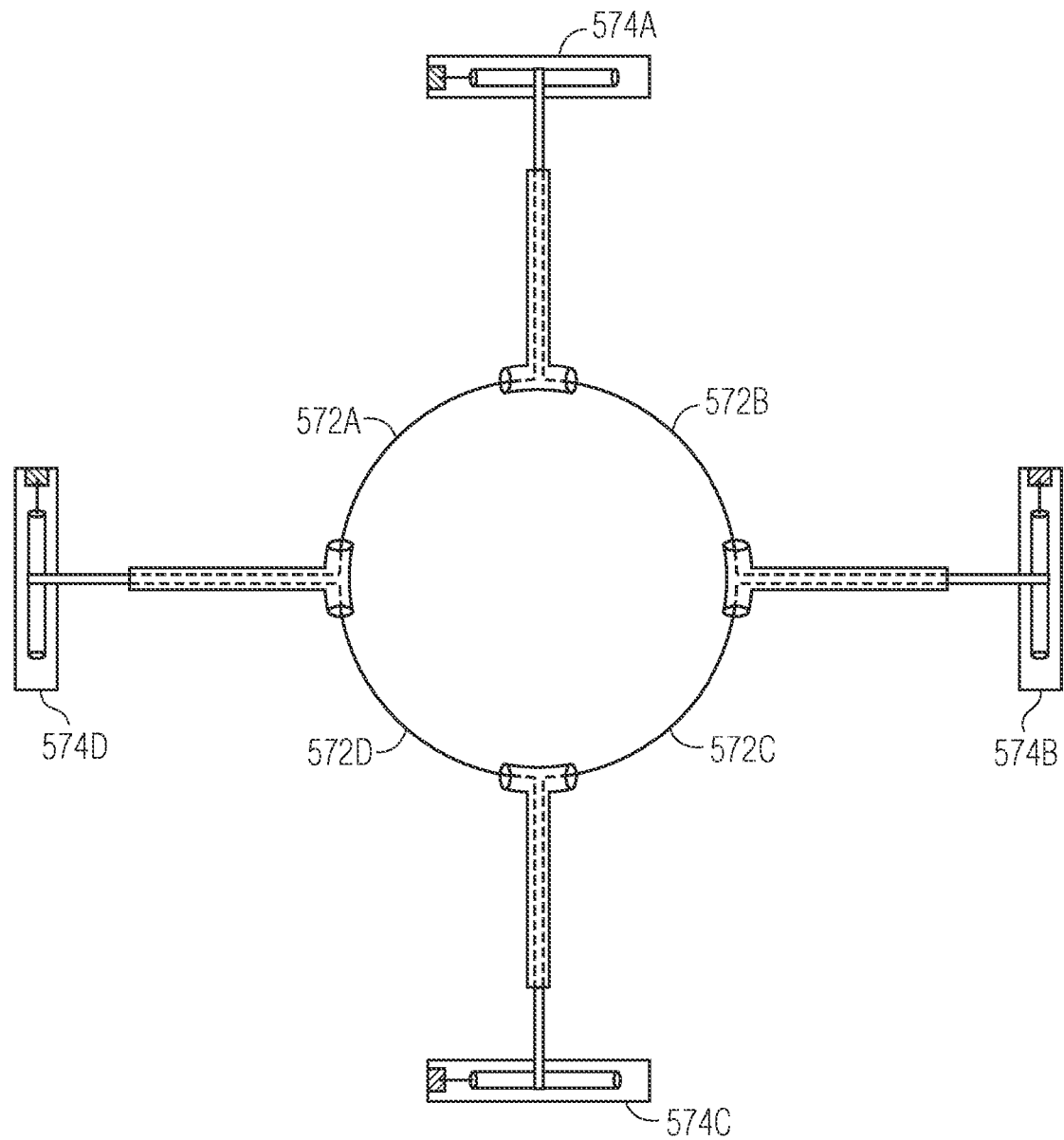
FIG. 5C shows a representation diagram of a deflector apparatus with four first elements, four second cable elements, and four winches for adjusting the length of the cables.

FIGS. 5A-5C show a possible structure for controlling the configuration of the second element. Apparatus with only four first elements is shown for ease of interpretation. Referring to FIG. 5A, as first elements 510A-D are retracted (by movement which is radially outward in the figure), cable 512, the second element, is gradually unspooled from spool 518 by motorized apparatus 516 in housing 514. (The segment of cable which lies between each of 510A/B, 510B/C, 510C/D and 510D/A is shown in a curved configuration, which would be the conceptual limiting case with an infinite number of first elements; In the case of a large number of first elements, a many-sided polygon would approximate the circle shown in the figure.) As shown in the figure, the terminal segment of each radial arm forms a curved cylindrical shape which allows the cable to pass through. When the first elements go from the retracted state to the deployed state, motor 516 causes cylinder 518 to take up cable slack as it becomes available. Embodiments of the invention in which 512 is a spring apparatus (see hereinbelow) are possible.

FIG. 5B shows an apparatus similar to that of 5A, except that there are two cables, 542A and 542B. The slack for one end of each of 542A and 542B is controlled by slack uptake and release apparatus 544A and 544B (each of which operate in similar fashion to that of 514).

FIG. 5C shows an apparatus similar to that of FIGS. 5A and 5B except that there is one cable segment (572A-D) for each pair of adjacent retractable arms, and one slack uptake and release apparatus (574A-D) for one end of each pair of adjacent cable ends. For example, when the apparatus in FIG. 5C goes from the deployed to the retracted state:

574A unrolls appropriate portions of one end of cable 572A and one end of cable 572B;

574B unrolls appropriate portions of one end of cable 572B and one end of cable 572C;

574C unrolls appropriate portions of one end of cable 572C and one end of cable 572D; and 574D unrolls appropriate portions of one end of cable 572D and one end of cable 572A.

Figure 5D:
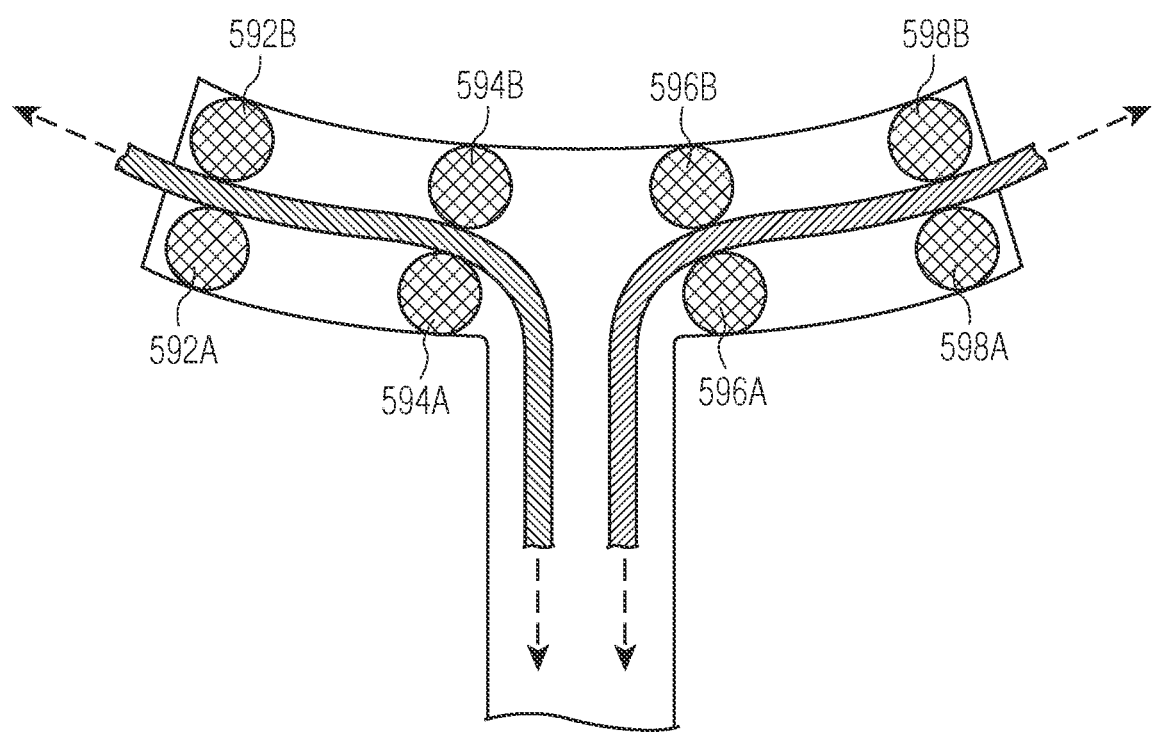
FIG. 5D shows a representational diagram of a T-shaped leading end of a first element, showing apparatus to decrease the friction due to motion of a cable.

Configurations of the invention with various friction reducing elements are possible. FIG. 5D shows a representational cross sectional view of the terminal protuberance of a first element in one embodiment of the invention. In order to minimize friction between the cable and the first element, one or more of friction reducing elements 592A, 592B, 594A, 594B, 596A, 596B, 598A, and 598B are included. These may be flat rolling elements, or grooved wheels. In another embodiment of the invention, 592A and B may be considered to be a cross-sectional representation of a circular bearing device which guides the cable with minimal friction; the same is true of the 594A and B pair, the 596A and B pair and the 598A and B pair. Embodiments of the invention with either a greater or lesser number of guiding elements are possible. Embodiments of the invention in which the friction-reducing elements are actively lubricated, or are self-lubricating are possible. Many other friction reducing configurations will be apparent to those skilled in the art.

Figure 6A:
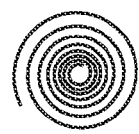
FIG. 6A is a representational diagram showing a coiled second element, in a configuration corresponding to a fully deployed state.
Figure 6B:
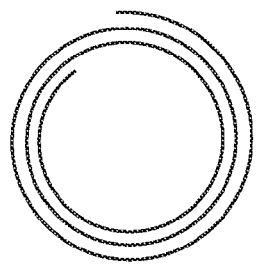
FIG. 6B is a representational diagram showing a coiled second element, in a configuration corresponding to a partially deployed state.
Figure 6C:
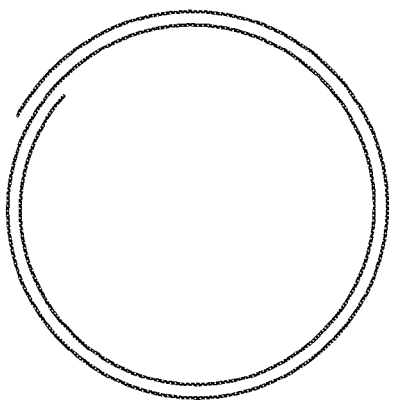
FIG. 6C is a representational diagram showing a coiled second element, in a configuration corresponding to a partially deployed state, showing a lesser degree of deployment than that of FIG. 6B.
Figure 6D:
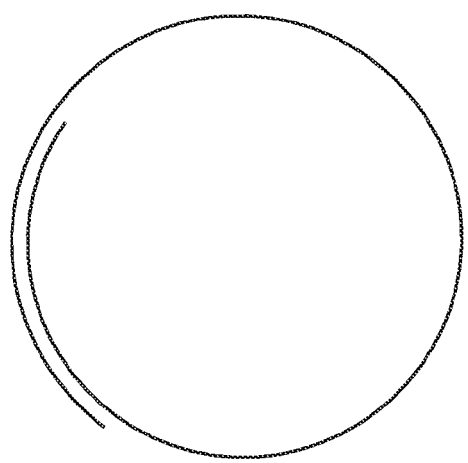
FIG. 6D is a representational diagram showing a coiled second element, in a configuration corresponding to a partially deployed state, showing a lesser degree of deployment than that of FIG. 6C.
Figure 6E:
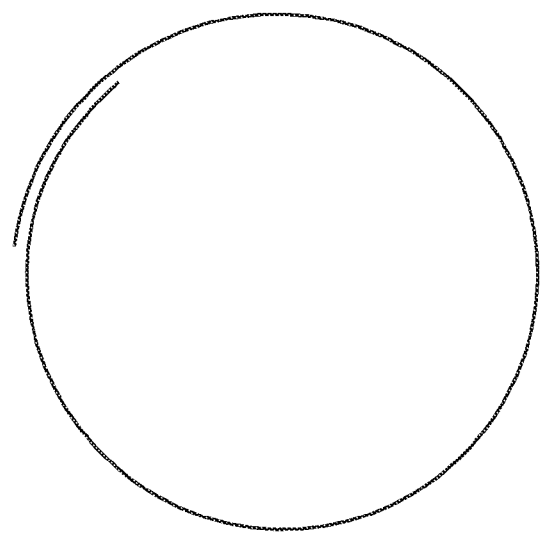
FIG. 6E is a representational diagram showing a coiled second element, in a configuration corresponding to a fully retracted state.

FIGS. 6A to 6E, shows a circular spring apparatus which provides the attractive force between adjacent distal ends of the first elements when they are deployed. FIGS. 6A to 6E correspond, respectively to the states of deployment/retraction shown in FIGS. 2A to 2E, i.e. five states ranging from first elements fully deployed (FIG. 6A) to first elements fully retracted (FIG. 6E).

Figure 7A:
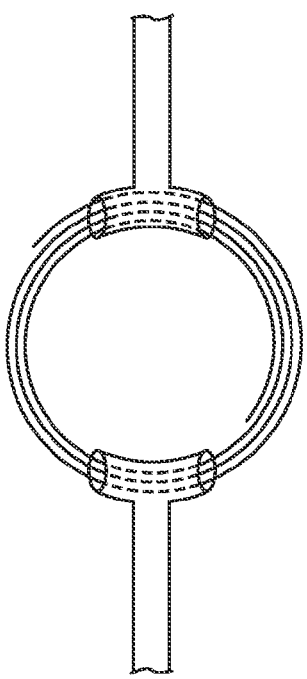
FIG. 7A is a representational diagram showing a coiled second element passing through the leading edge of each of two T-shaped first elements, in a deployed configuration.
Figure 7B:
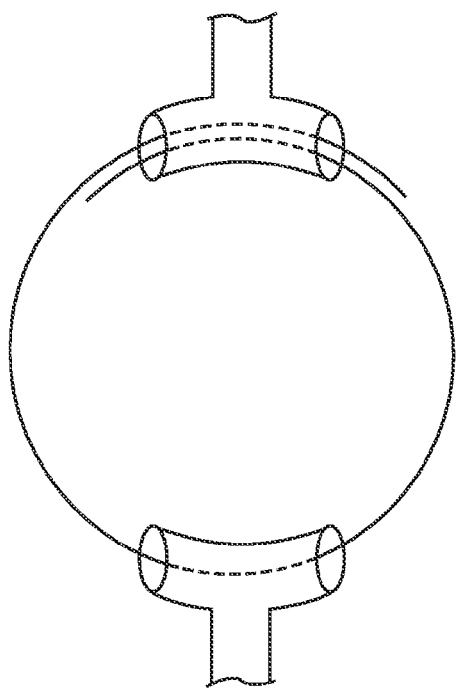
FIG. 7B is a representational diagram showing a coiled second element passing through the leading edge of each of two T-shaped first elements, in a retracted configuration.

FIG. 7, consisting of FIGS. 7A and 7B shows the circular spring apparatus of FIG. 6 in conjunction with first elements in two different states of retraction/deployment:

FIG. 7A corresponds to FIGS. 2B and 6B; while

FIG. 7B corresponds to FIGS. 2D and 6D.

Embodiments of the spring apparatus shown in FIGS. 6 and 7 in which one end of the spring is anchored to a first element are possible.

Figure 8A:
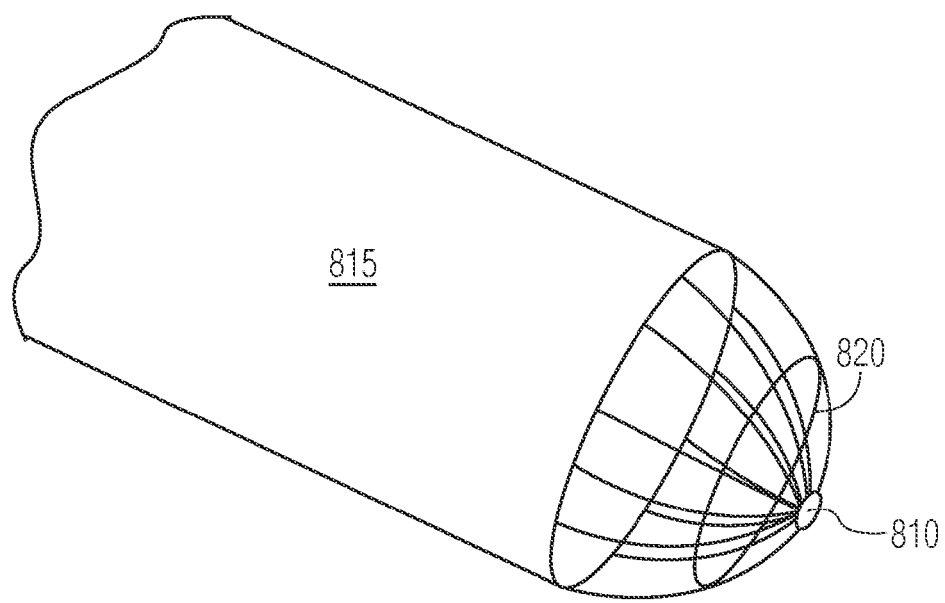
FIG. 8A is a perspective view of a jet engine with a deployed deflector apparatus having multiple curved first elements and two transverse second elements.
Figure 8B:
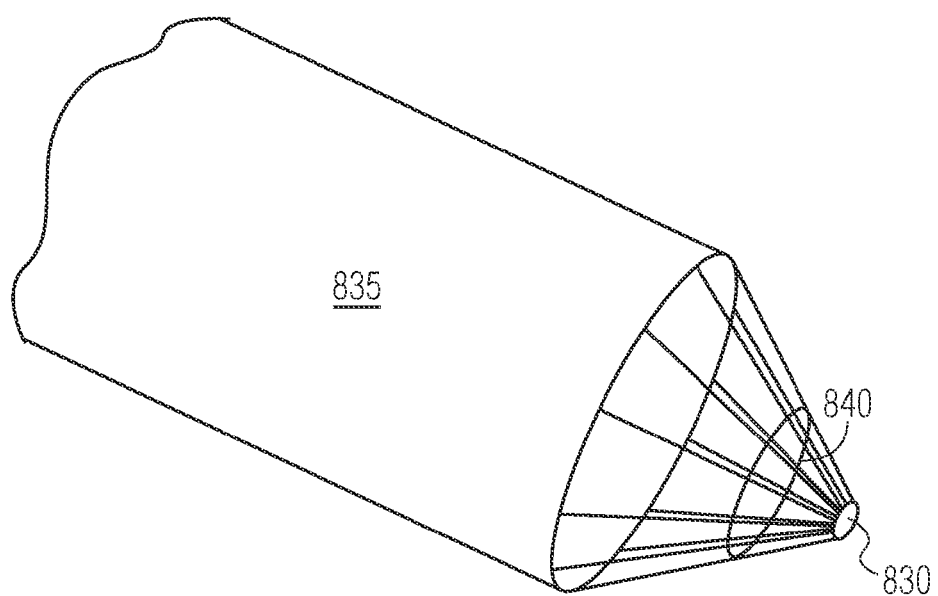
FIG. 8B is a perspective view of a jet engine with a deployed deflector apparatus having multiple straight first elements and two transverse second elements.
Figure 8C:
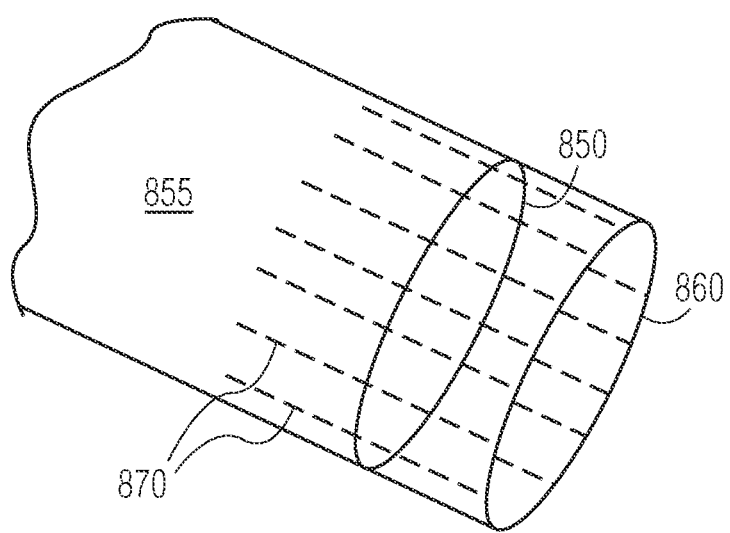
FIG. 8C is a representational diagram of a jet engine indicating the storage of retracted first elements and two retracted second elements.

FIGS. 8A and 8B (analogous to FIGS. 1A and 1B respectively) show a configuration of the apparatus in which there are two transverse/second element supporting apparatus structures (810 and 820 for engine 815 in FIG. 8A, and 830 and 840 for engine 835 in FIG. 8B). The mode of operation of the transverse apparatus shown in each of the two figures is similar to that of the configurations with one transverse supporting apparatus, i.e. in the case of two such apparatus, each is retractable as shown by 850 and 860 in FIG. 8C. In FIG. 8C, the engine is indicated by 855 and the first support elements are indicated by broken lines 870.

FIGS. 9A-E (each showing two circular second elements) are analogous to FIGS. 2A-E (each showing one circular second element). As indicated hereinabove, in many configurations the circle representing the second element in the figure represents the theoretical upper limit of a many-sided polygon.

Figure 9A:
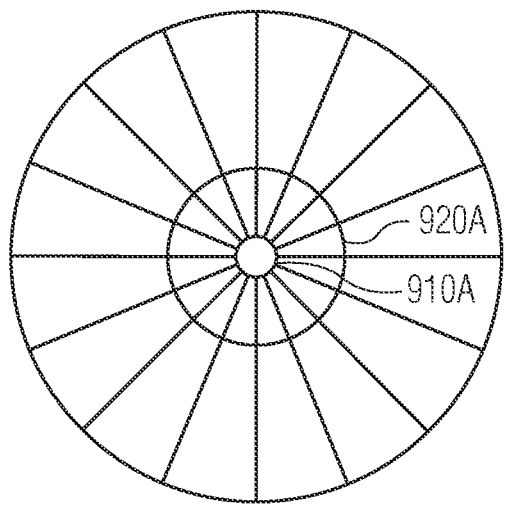
FIG. 9A is a representational diagram showing a front view of a fully deployed deflector apparatus with 16 first elements arrayed in a radially symmetric configuration, and two second elements.
Figure 9B:
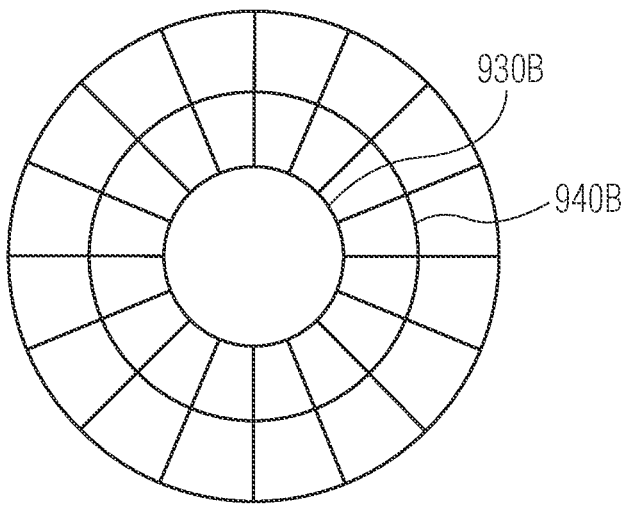
FIG. 9B is a representational diagram showing a front view of a partially deployed deflector apparatus with 16 first elements arrayed in a radially symmetric configuration, and two second elements.
Figure 9C:
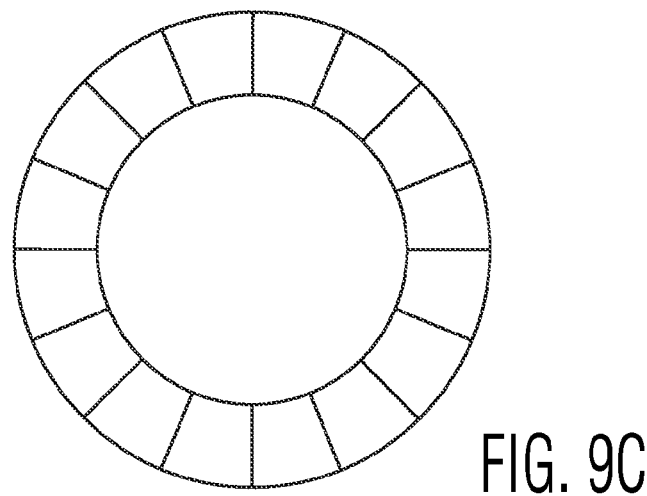
FIG. 9C is a representational diagram showing another front view of a partially deployed deflector apparatus with 16 first elements arrayed in a radially symmetric configuration, and two second elements, showing a lesser degree of deployment than that shown in FIG. 9B.
Figure 9D:
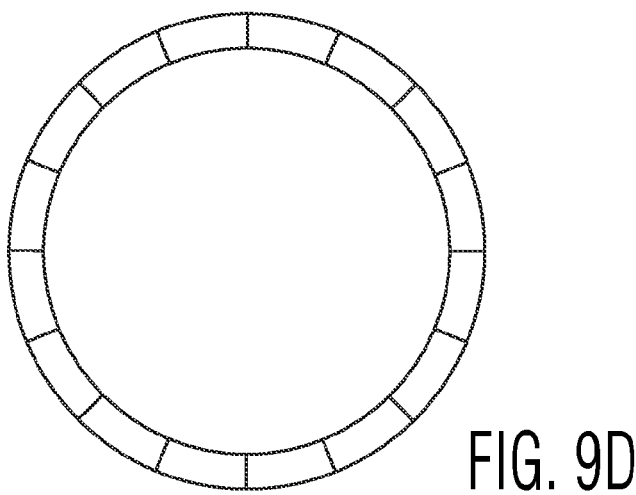
FIG. 9D is a representational diagram showing another front view of a partially deployed deflector apparatus with 16 first elements arrayed in a radially symmetric configuration, and two second elements, showing a lesser degree of deployment than that shown in FIG. 9C.
Figure 9E:
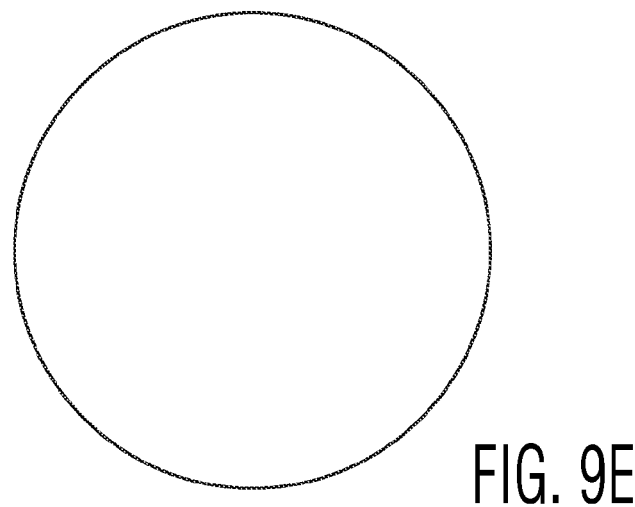
FIG. 9E is a representational diagram showing a front view of the deflector apparatus of FIG. 9D in a fully retracted state.

In FIG. 9A, the fully deployed configuration, the distal (i.e. nearest to the leading end) circular apparatus is 910A and the proximal (i.e. nearest to the trailing edge) one is 920A. In FIG. 9B, the partially retracted configuration, the distal circular apparatus is 930B and the proximal one is 940B. In FIGS. 9C-E, the proximal circular apparatus is retracted within the engine housing, so the appearance is identical to FIGS. 2C-2E, respectively.

Figure 10A:
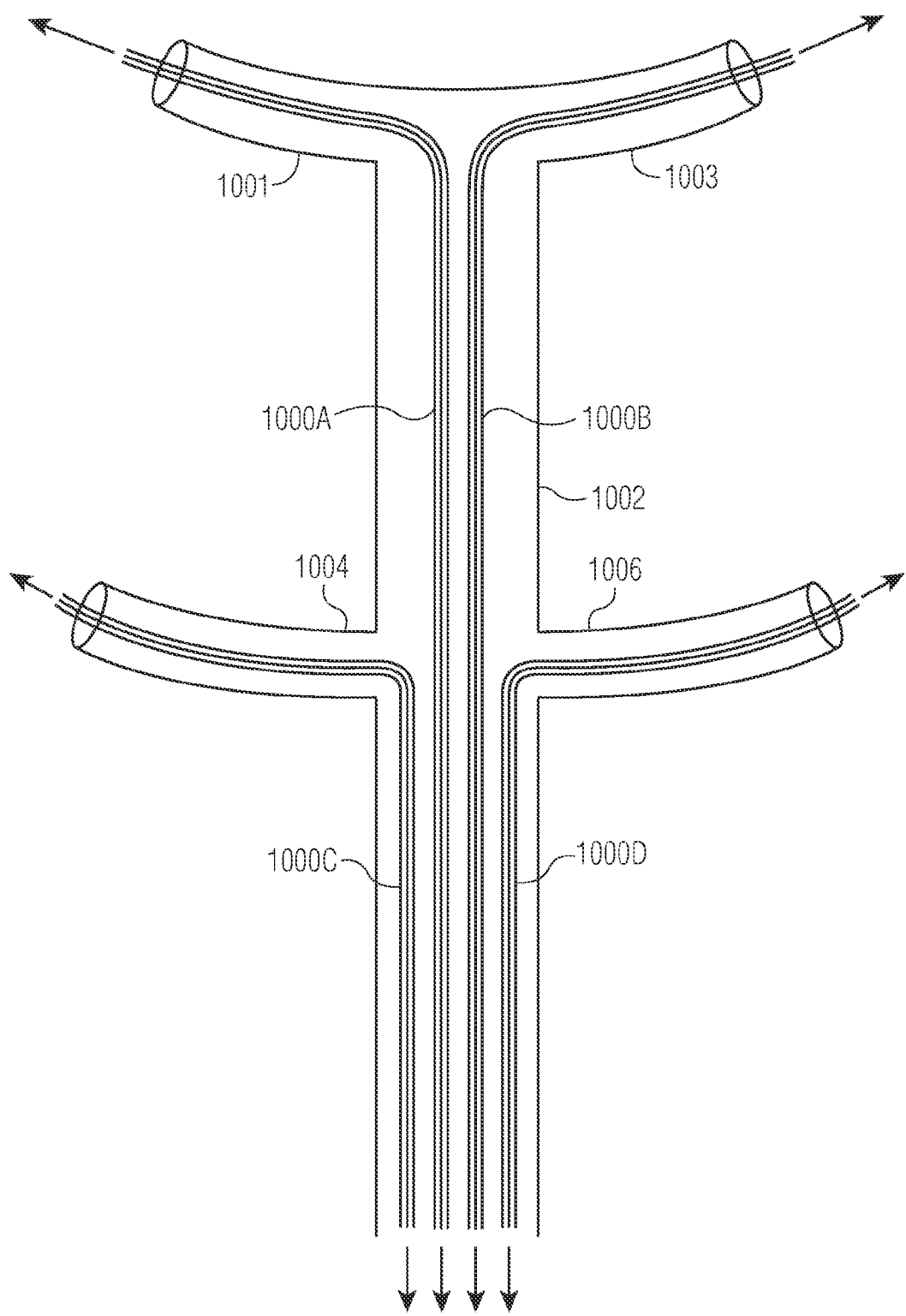
FIG. 10A is a representational diagram showing a cross sectional view of a tubular T-shaped first element, with projections forming two pairs of second elements, containing cables.

FIG. 10A shows a representational view of a complex first element for a configuration with one distal transverse supporting apparatus and one transverse supporting apparatus in the mid-portion of the first element. In principle, such a complex element has features of both a first element (i.e. as it exits the engine housing, one section extends longitudinally) and a second element (has projections which, as they exit the housing, extend in a direction transverse to the longitudinal section). The entire apparatus of FIG. 10A is analogous to element 510A in FIG. 5A (which is a first element without a transverse supporting apparatus in its midportion). Referring again to FIG. 10A, cables 1000A and 1000B help to align and hold together the distal ends of the complex first elements; They are analogous to any of [a] 512 in FIG. 5A; [b] 542A and 542B in FIG. 5B; and [c] any of (i) 572A and 572B, (ii) 572B and 572C, (iii) 572C and 572D, and (iv) 572D and 572A in FIG. 5C. In addition, cables 1000C and 1000D serve to anchor the midportion of each complex first element.

When the apparatus in FIG. 10A is utilized in a configuration analogous to that of FIG. 5C (i.e. an array of four of complex first element 1002), each cable segment analogous to 1000C in FIG. 10A extends to the neighboring first element to the left (see FIG. 10B), enters its main shaft, and comprises the segment analogous to 1000D in that left neighboring first element. Similarly, each cable segment analogous to 1000D in FIG. 10A extends to the neighboring first element to the right (see FIG. 10B), enters its main shaft, and comprises the segment analogous to 1000C in that right neighboring first element.

In a configuration analogous to that of FIG. 5A, the cable segment 1000C would extend from shaft 1002, out through projection 1004, and thence through the midportion of each first element (via projections analogous to each of 1004 and 1006), and ultimately return to first complex element 1002 via projection 1006 to form cable segment 1000D.

In configurations analogous to that shown in FIG. 5B, the cable segment 1000C would extend from shaft 1002, out through projection 1004, through the midportions of two or more adjacent first elements, each first element (via projections analogous to each of 1004 and 1006), and ultimately enter another first element via a projection analogous to 1006, and form a cable segment analogous to segment 1000D in another first element.

In configurations analogous to that of FIG. 5B, the cables within first elements traversed by transverse cable segment must be geometrically set up so that the transverse segment does not contact longitudinal segments analogous to 1000A and 1000B. Although FIG. 10A shows all four cable segments lying in the same plane (i.e. the plane of the figure), in three dimensions, the transverse segment could cross through the shaft either so that it does not contact either of the segments analogous to 1000A or 1000B (i.e. by crossing above or below the plane defined by 1000A and 1000B).

The advantage of projections 1004 and 1006 is that they help guide and secure the transverse cable in the midportion of the first element, and allow for a locking mechanism to further stabilize the apparatus. The disadvantage is that they add weight, they further restrict the open area in front of the engine, and they make retraction of the first element more complex. Embodiments of the invention in which each of projections 1004 and 1006 are absent, replaced by respective openings in the shaft of 1002 to accommodate respective cables 1000C and 1000D are possible.

Though FIG. 10A shows projections 1004 and 1006 to be in the midportion of the first element, configurations are possible in which the junction is asymmetrically located, either proximally (i.e. nearer to the engine housing) or nearer to the distal end of the apparatus.

The proximal ends of each of 1000C and 1000D are linked to cable control apparatus which appropriately releases or takes in cable, as the situation may require. Such cable control apparatus is analogous to any of [a] 514, 516 and 518 shown in FIG. 5A; [b] 544A and 544B shown in FIG. 5B; and [c] 574A, 574B, 574C and 574D shown in FIG. 5C.

Cables may be secured within 1002 by a variety of means and mechanisms including:
a) situating the cable within a non-moving sheath;
b) grooves within 1002 for each cable; and/or
c) one or more guiding wheels, rollers, or bearings along the length of the cable within 1001, 1002, 1003, 1004 and/or 1006, analogous to that which is shown herein in conjunction with FIG. 5D.

Figure 10B:
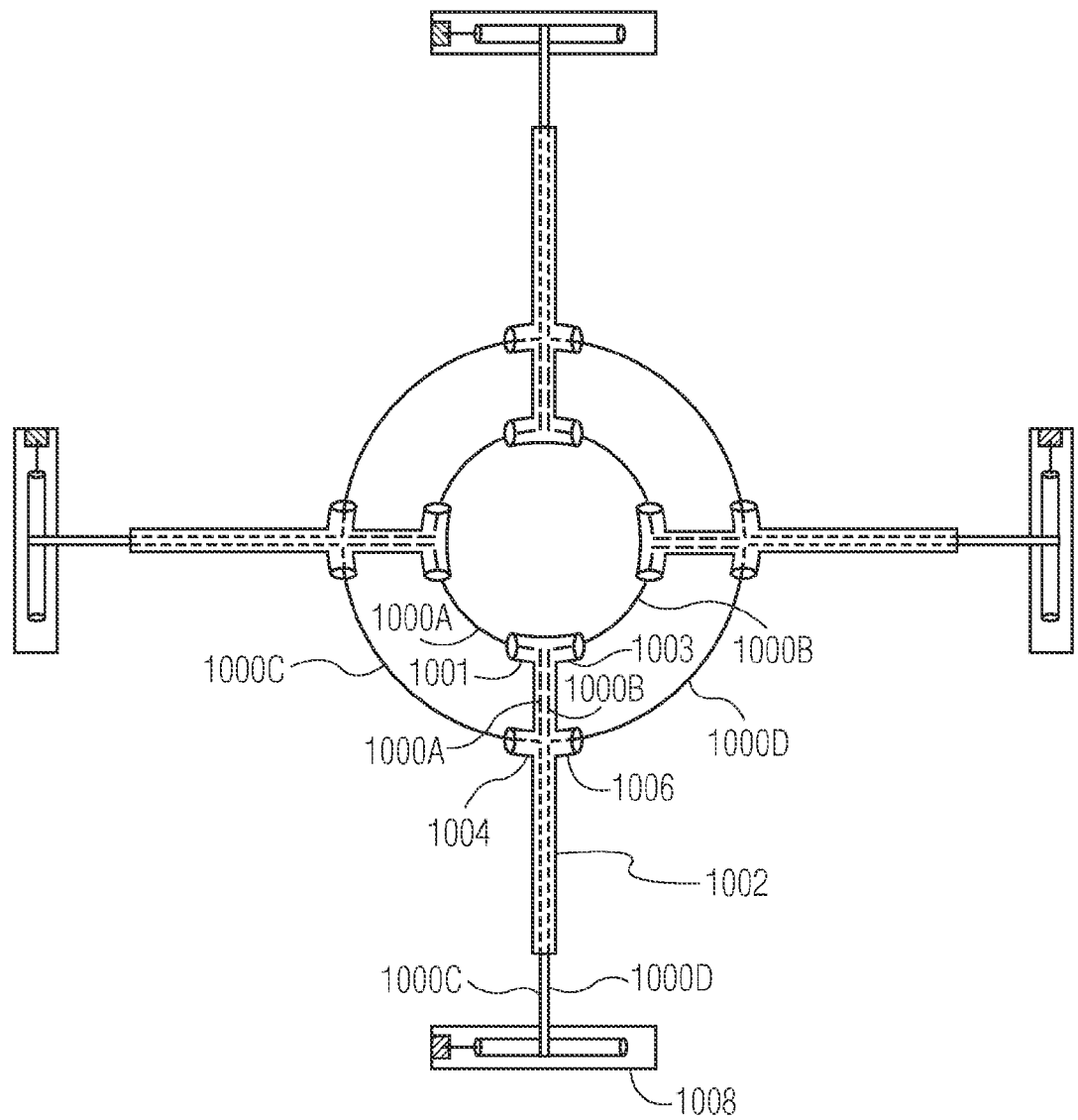
FIG. 10B shows a representation diagram of a deflector apparatus with four first elements, four second cable elements each located at the leading edge of the first elements, four additional second cable elements each located between the leading edge and the trailing edge of the first elements, and four winches for adjusting the length of the additional cables elements.

FIG. 10B shows a deflector which includes an array of four of the complex first elements shown in FIG. 10A. The apparatus shown in the figure is analogous to that shown in FIG. 5C. However, the apparatus in FIG. 10B includes an additional transverse support group of structures. Cable take-up apparatus 1008 controls the length of cable segment 1000D, which passes through 1002, exits through projection 1006 and enters the corresponding structure on the right side of the figure. Similarly, cable take-up apparatus 1008 controls the length of cable segment 1000C, which passes through 1002, exits through projection 1004 and enters the corresponding structure on the left side of the figure. The operation of 1008 and associated components is similar to that of 574A-D in FIG. 5C. These aforementioned structures link the midsection (which need not be located at the geometric middle) of the complex first elements (e.g. 1002).

The cable segments which forms the distal second element exit through projection 1003 as 1000B, and then enters the corresponding structure indicated by elements on the right side of the figure; Another cable segment which forms the distal second element exit through projection 1001 as 1000A, and then enters the corresponding structure indicated by elements on the left side of the figure.

The four cable take-up apparatus for the distal second elements is not shown in the figure, but is similar to that of 1008, and 574A-D. Long broken lines in the figure indicate cable for the distal/leading edge second elements which are contained within 1002. Although these cable segments extend into the proximal shaft of 1002 (as shown in FIG. 10A), these segments of cable are not shown in the figure, for clarity. Short broken lines indicate cable for the proximal/midportion second elements, which are shown in their full extent.

Figure 10C:
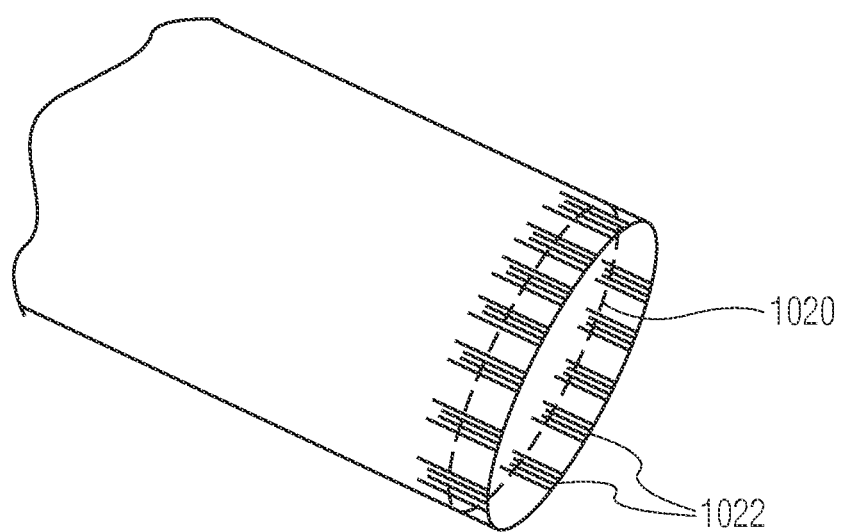
FIG. 10C is a representational diagram of a jet engine indicating the storage of retracted first elements and two retracted second elements.

FIG. 10C, analogous to FIG. 1D, shows a representational view of the retracted state, of an embodiment with (a) one transverse stabilizing cable 1020 in its midportion, and (b) collapsible/telescoping first elements 1022. With embodiments of the invention with lateral protuberances in the midsection, there will be a limitation to the collapse above and below such midsection protuberances. An embodiment of the invention is also possible in which the midsection protuberances themselves are able to collapse/telescope.

The telescoped configuration for the retracted state shown in FIG. 10C could also accommodate curved first elements (e.g. as shown in FIGS. 3A and 3B), as discussed hereinabove in conjunction with FIG. 1D.

Figure 11A:
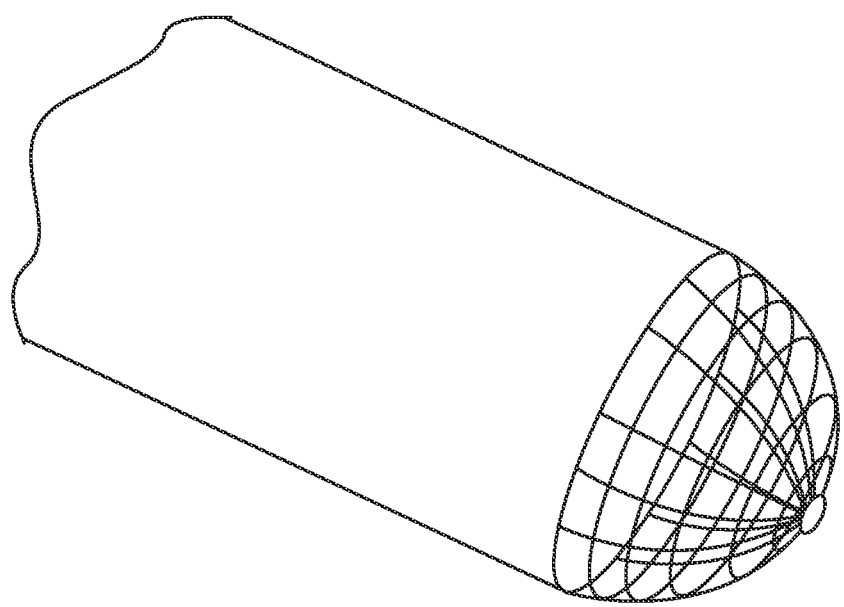
FIG. 11A is a perspective view of a jet engine with a deployed deflector apparatus having multiple curved first elements and six transverse second elements.
Figure 11B:
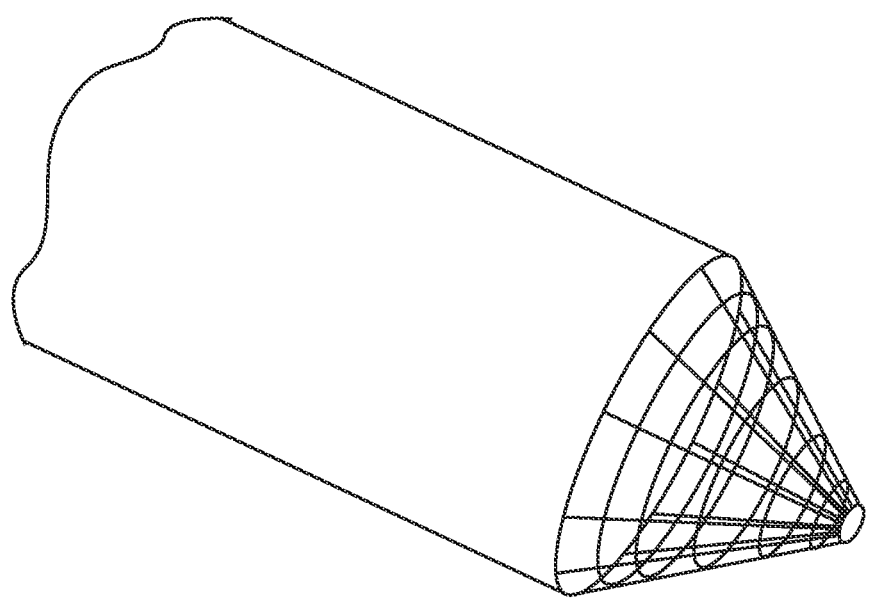
FIG. 11B is a perspective view of a jet engine with a deployed deflector apparatus having multiple straight first elements and six transverse second elements.

Whereas the aforementioned embodiments contain either no transverse elements along the first elements, or one such element (FIGS. 8A to 9E), FIG. 11A shows a configuration with 5 transverse elements and curved first elements (analogous to FIGS. 1A and 8A) and FIG. 11B shows a configuration with 5 transverse elements and straight first elements (analogous to FIGS. 1B and 8B). Configurations with greater and lesser numbers of first elements are possible. More first elements result in a greater degree of first element stability and the ability to limit the maximum size of an object which may cross the barrier resulting from the deployment of the apparatus described herein. On the other hand, more first elements result in greater weight, greater resistance to air entry and more complex cable arrangements within first elements and more complex cable supporting apparatus.

Figure 12A:
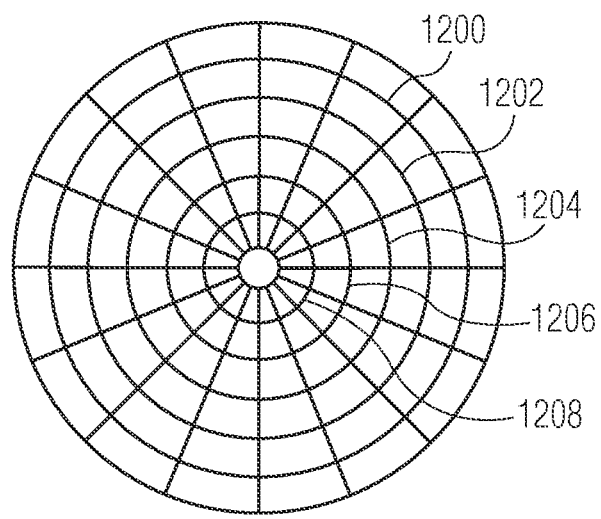
FIG. 12A is a representational diagram showing a front view of a fully deployed deflector apparatus with 16 first elements arrayed in a radially symmetric configuration, and six second elements.
Figure 12B:
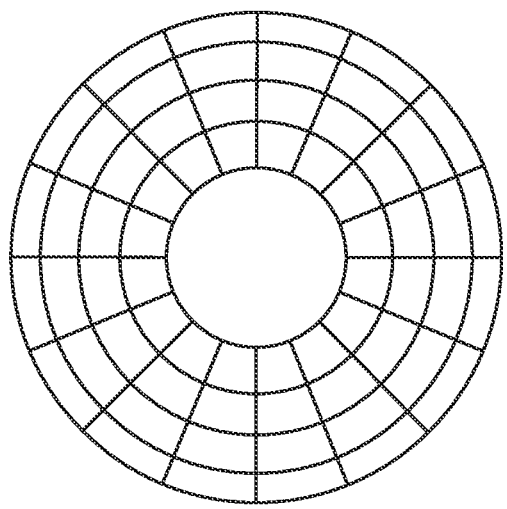
FIG. 12B is a representational diagram showing a front view of a partially deployed deflector apparatus with 16 first elements arrayed in a radially symmetric configuration, and six second elements.
Figure 12C:
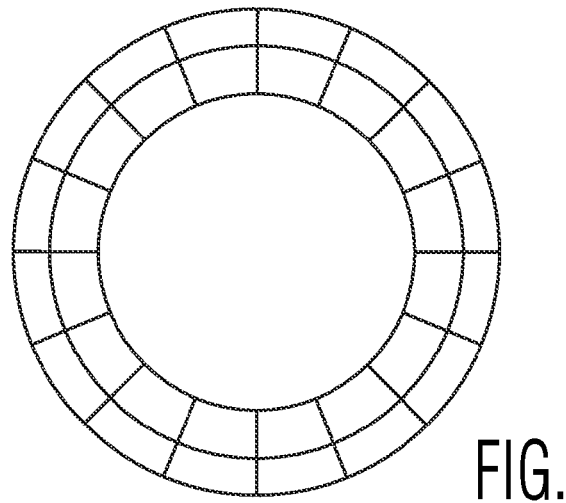
FIG. 12C is a representational diagram showing another front view of a partially deployed deflector apparatus with 16 first elements arrayed in a radially symmetric configuration, and six second elements, showing a lesser degree of deployment than that shown in FIG. 12B.
Figure 12D:
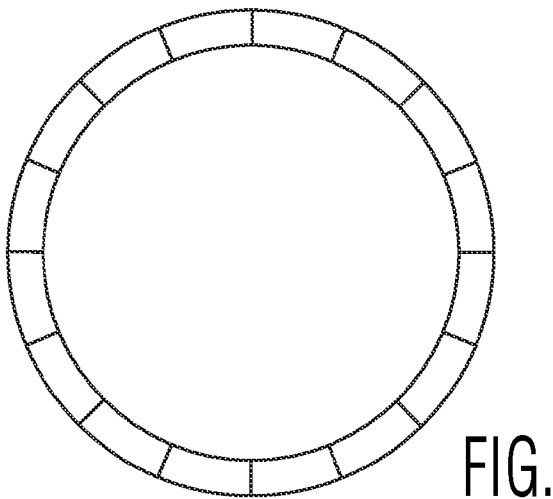
FIG. 12D is a representational diagram showing another front view of a partially deployed deflector apparatus with 16 first elements arrayed in a radially symmetric configuration, and six second elements, showing a lesser degree of deployment than that shown in FIG. 12C.
Figure 12E:
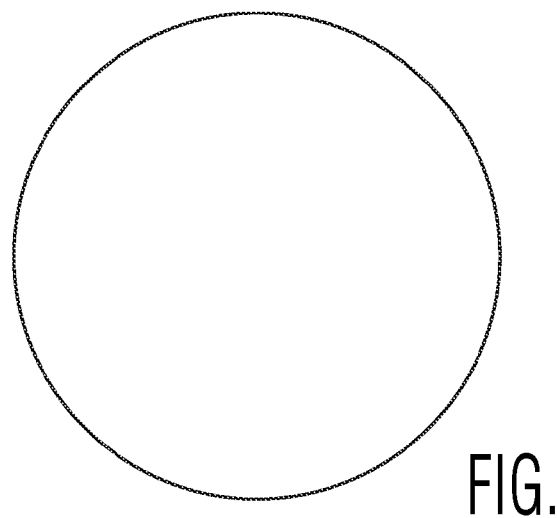
FIG. 12E is a representational diagram showing a front view of the deflector apparatus of FIG. 12D in a fully retracted state.

FIGS. 12A-E—analogous to FIGS. 2A-E and 9A-E—show a front view of some of the successive steps in the transition from a fully deployed apparatus (FIG. 12A) to a fully retracted one (FIG. 12E) for a configuration with five transverse elements, 1200, 1202, 1204, 1206 and 1208 (in addition to the distal transverse support common to all of the configurations hereinabove). FIG. 12B shows a state in which two of the five transverse elements have been retracted (and in which the non-retracted transverse elements and the distal supporting apparatus have each (i) been pulled back and (ii) undergone an increase in radius). FIG. 12C shows a state in which four of the five transverse elements have been retracted (and in which the one remaining non-retracted transverse element and the distal supporting apparatus have each (i) been further pulled back and (ii) undergone a further increase in radius). FIG. 12D shows a state in which all of the five transverse elements have been retracted (and in which the remaining non-retracted distal supporting apparatus has (i) been still further pulled back and (ii) undergone a still further increase in radius).

Figure 13:
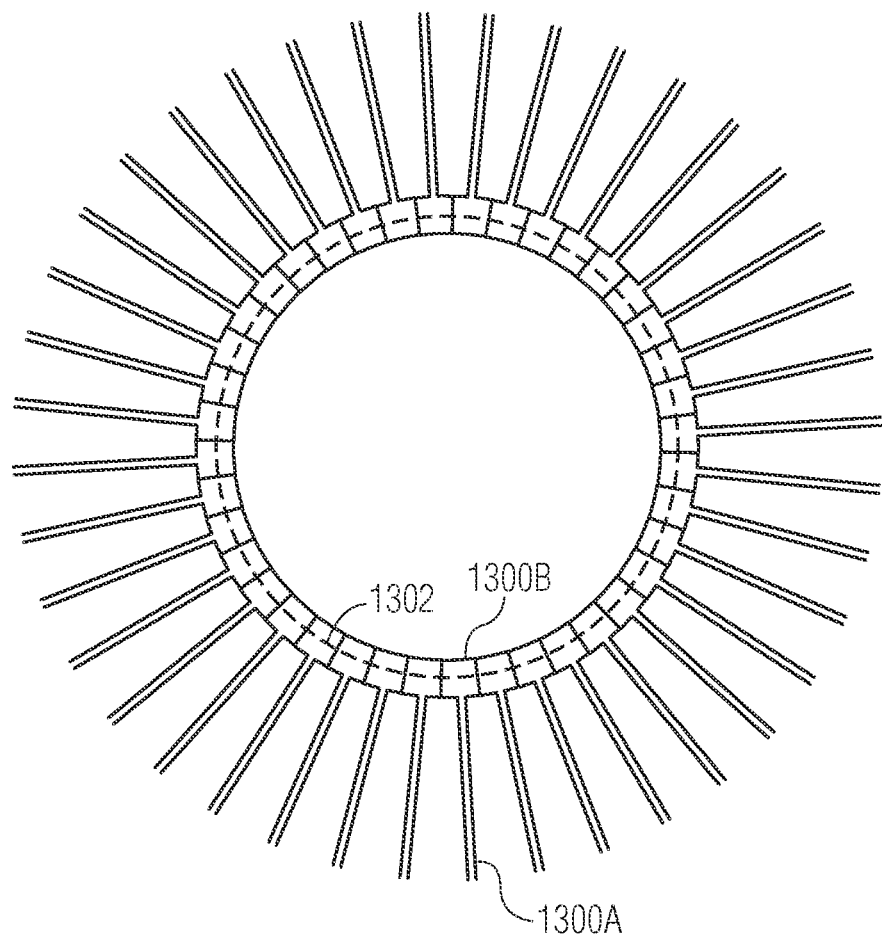
FIG. 13 is a representational diagram of a deflector apparatus with 40 T-shaped first elements in a fully deployed configuration.

FIG. 13 shows a front view of a fully deployed engine protection device with 40 first elements (1300A), in which first element has a terminal protuberance (1300B) which is analogous to 1001 and 1003 of FIG. 10A herein. Cable or cables 1302, analogous to the cable shown in any of the configurations of FIGS. 5A, 5B and 5C, serve to draw the protuberances together as the device is deployed, and to stabilize the protuberances as the device is retracted. In addition 1302 may secure each of the 40 protuberances 1300B so that they are in secure contact with each other. Another mechanism for securing each 1300B to its two adjacent neighboring 1300Bs is to have the surface of each form a secure fit with its neighboring 1300B, either because the surfaces are parallel, or because the surfaces have complementary extensions and depressions which promote such a fit. Furthermore, by making the projections and depressions cone-shaped rather than cylindrical, a non-perfect alignment of adjacent first elements during deployment may be corrected for.

In another embodiment of the invention, a magnetic attraction between adjacent protuberances may be used to promote their attraction during deployment. The magnetic mechanism may be from fixed elements (e.g. one side of each protuberance is a north magnetic pole, and the other side is a south pole, such that the arrangement is:

... (N-S)-(N-S)-(N-S)-(N-S) ...

Figure 14:
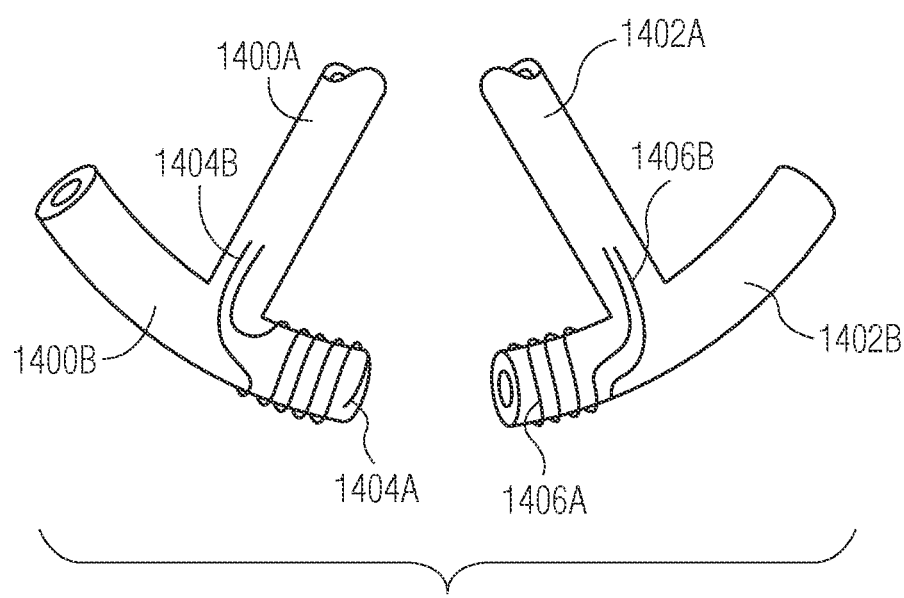
FIG. 14 is a representational diagram of two T-shaped first elements with electromagnetic apparatus at two adjacent projections.

Alternatively, the source of magnetism may be electromagnetic, as shown in FIG. 14, thereby allowing for a simple means of turning off the attractive mechanism. FIG. 14 shows a coil of conducting wire 1404A on one end of first element 1400A for generating a magnetic field when a current is passed through it. The wires need not be on the surface of the object, and may be embedded beneath the surface. The ends of the coil 1404B pass through the shaft of 1400A to a power supply and control unit. There is corresponding apparatus 1406A on the end of first element 1402A for generating a magnetic field when a current is passed through it. The ends of the coil 1406B pass through the shaft of 1402A to a power supply and control unit. The orientation and winding of the coils is such that 1404A attracts 1406A when a current is passed through each. In a preferred embodiment, additional coils are placed symmetrically on each projection, i.e. 1400B and 1402B, to allow for the attraction to each of their respective neighboring projections.

In yet another embodiment of the invention, an active locking mechanism between adjacent protuberances is possible. Activation and deactivation of the locking mechanism may be electric or via one or more cables which traverse one or more of first elements with such a mechanism.

Figure 15A:
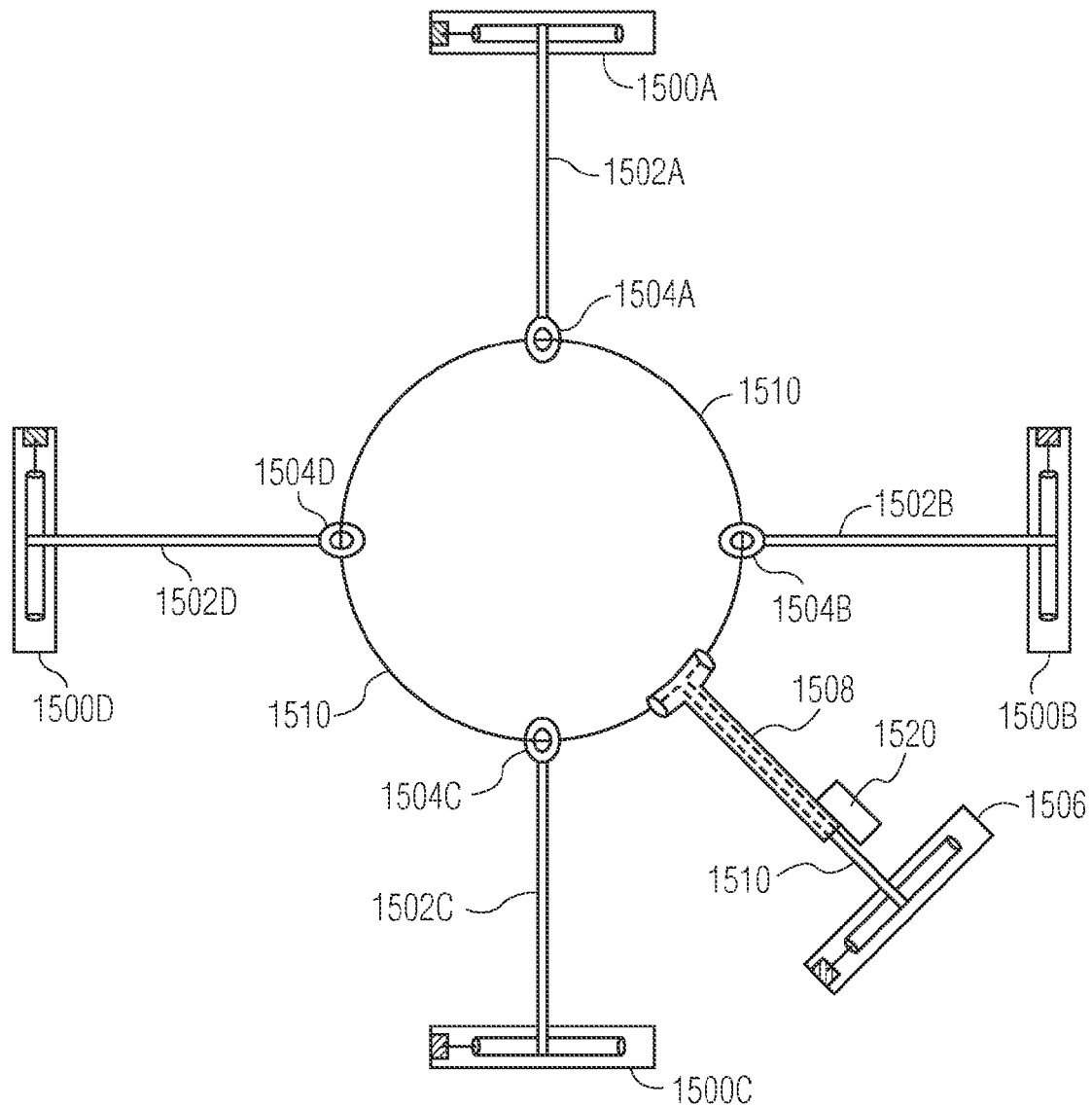
FIG. 15A is a representation diagram of a deflector apparatus with four cable-based first elements, four winches for adjusting the length of the respective cables, and a cable-based second element associated with a tubular T-shaped additional first element and with an additional associated winch.

FIG. 15A shows an embodiment of the invention in which the first elements are not composed of rigid rods. These first elements consist of cables 1502A-D. At their respective proximal ends are cable take-up and release apparatus 1500A-D; At their respective distal ends is an eyelet 1504A-D, which allows each of 1502A-D to be pulled during the deployment process. Deployment is caused when cable take-up 1506 winds in 1510, causing the perimeter of this cable loop to decrease. As the decrease occurs cables 1502A-D are pulled out of 1500A-D. The tension on the loop 1510 exerted by each of 1500A-D is adjusted to keep loop 1510 centered over the air intake. In one version of this embodiment of the invention, an apparatus 1520 (either electromechanical, hydraulic or pneumatic) pushes 1508 distally (toward the center of the air intake) during deployment. The retraction of the deflector involves active uptake of cables 1502A-D by take-up apparatus 1500A-D, with simultaneous spooling out of cable from 1506. In the version which includes 1520, it may be used to facilitate the retraction of 1508. The tension of each of 1500A-D on each respective one of 1502A-D is adjusted, during the retraction process, to keep the deflector properly centered at all times.

Figure 15B:
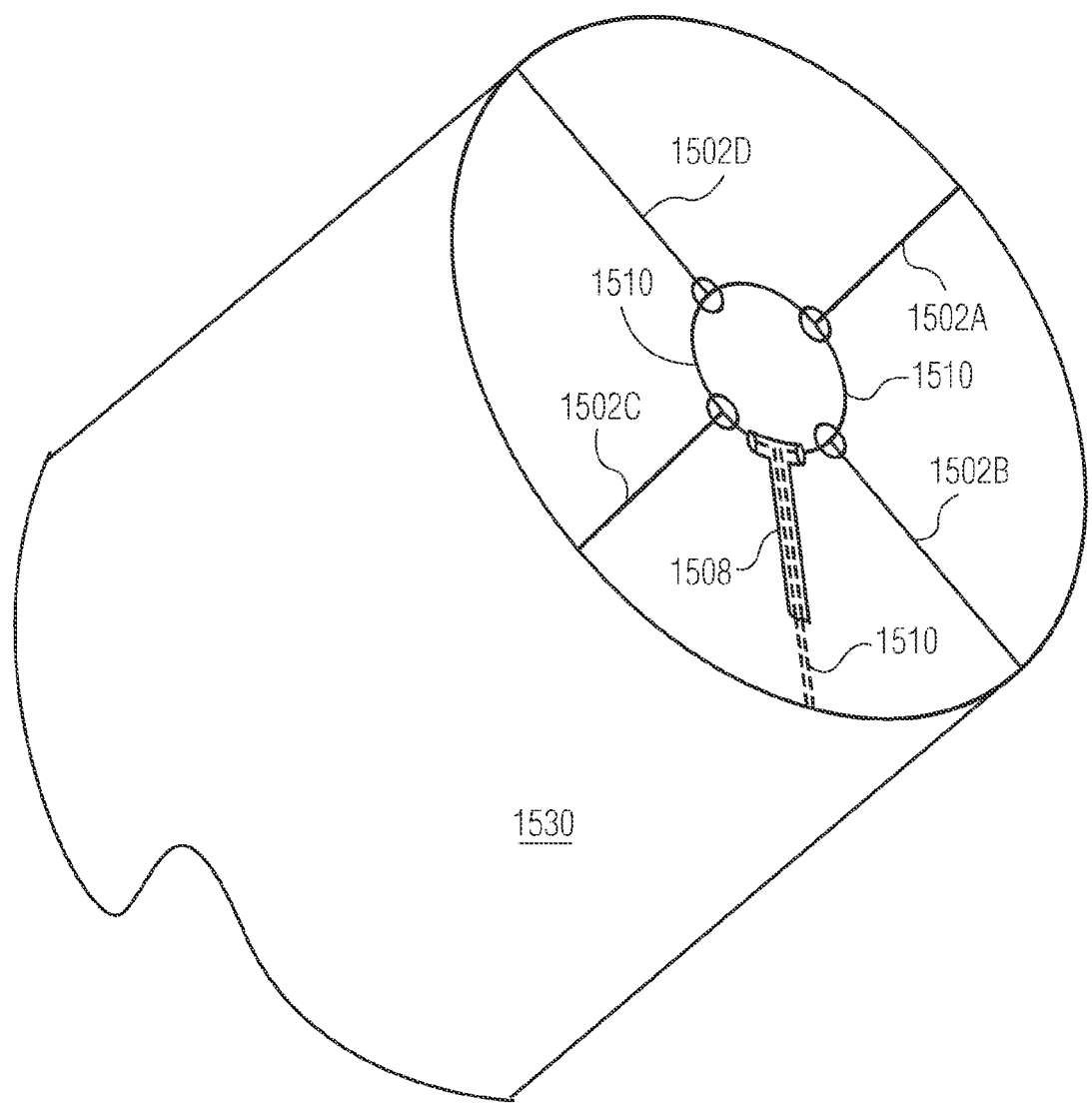
FIG. 15B is a perspective view of a jet engine with a deployed deflector having the apparatus shown in FIG. 15A.

FIG. 15B shows a perspective view of a jet engine 1530, and the first elements and second elements (with element numbers corresponding to those of FIG. 15A) which make up this embodiment. The embodiment shown in the figure contains no rigid support elements except for 1508. It would therefore be situated at the mouth of the engine.

Versions of this embodiment with two or more sets of apparatus to shorten loop 1510 are possible. Versions are also possible in which each of 1502A-D is a rigid telescoping rod, anchored to the engine housing, and deployed by the force exerted by cable take-up device 1506.

Figure 16A:
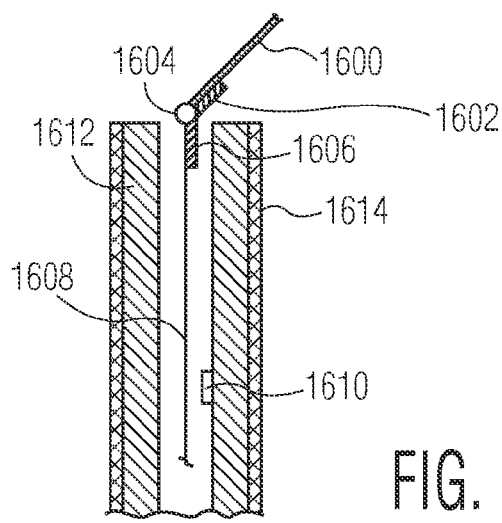
FIG. 16A is a cross sectional view of a portion of a hinge and a hinge-controlling apparatus for attaching a first element to a jet engine, showing a deployed state of the first element.
Figure 16B:
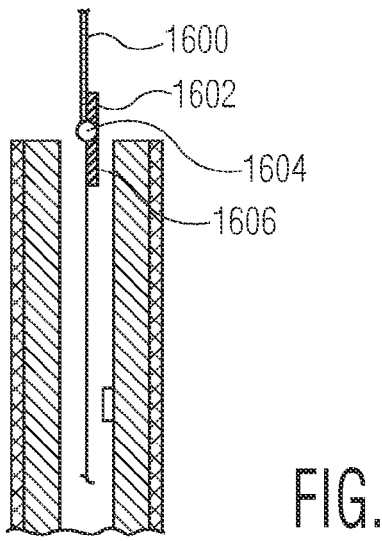
FIG. 16B is a cross sectional view of the hinge and hinge-controlling apparatus of FIG. 16A, showing a transitional state between the deployed state and the retracted state.
Figure 16C:
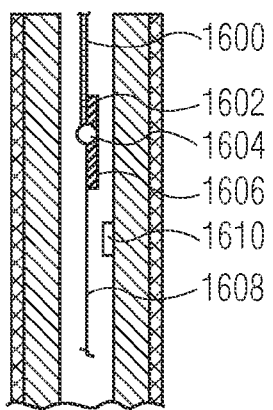
FIG. 16C is a cross sectional view of the hinge and hinge-controlling apparatus of FIG. 16B, showing the retracted state.

FIGS. 16A-C show an embodiment of a hinge which anchors a first element 1600 to the engine housing, and is retractable. The first element is joined to one hinge component 1602, and retraction rod 1608 is joined to the other hinge component 1606. 1602 and 1606 pivot about 1604. 1608 is moved in and out by apparatus 1610, either mechanically or electromagnetically. 1608 is anchored to inner housing wall 1612 (anchoring not shown in figure), which is contiguous with 1614 which is the support apparatus for the engine.

Figure 17:
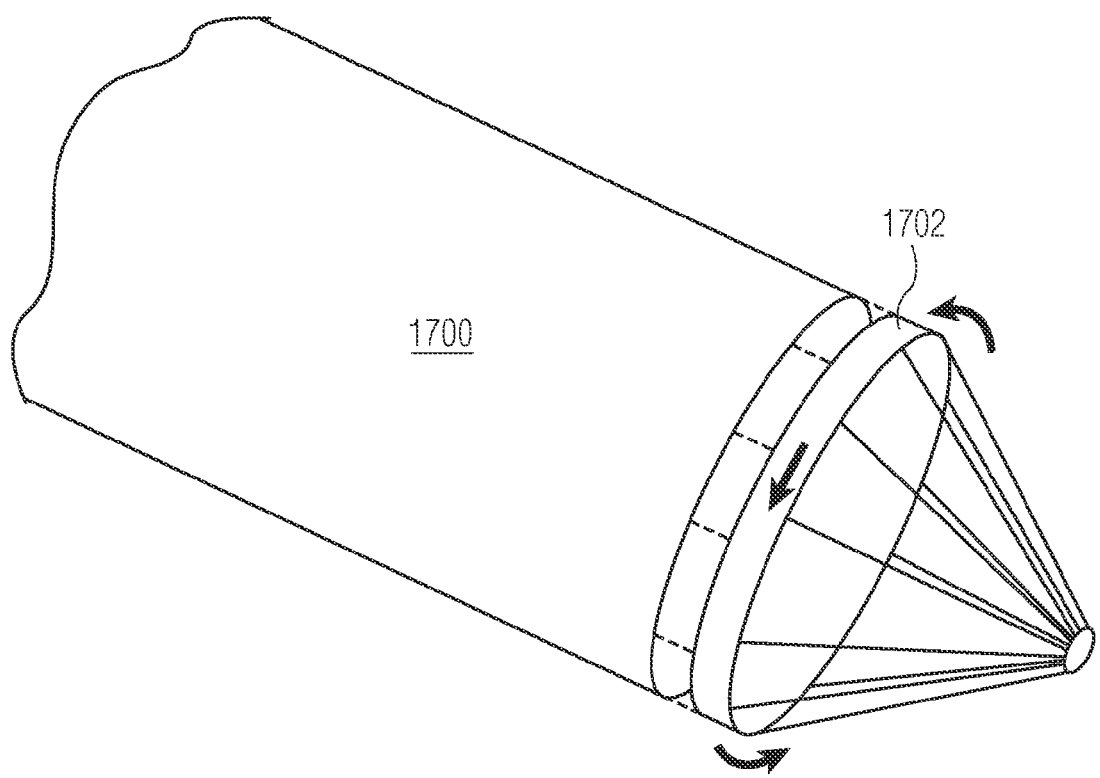
FIG. 17 is a perspective view of a jet engine with a deployed deflector apparatus having multiple straight first elements and a single transverse second element, with the deflector apparatus showing rotational motion about the longitudinal axis of the engine.

FIG. 17 shows an embodiment of the invention in which the first and second elements apparatus rotate along the long axis of the engine, thereby to reduce the aerodynamic consequences of a fixed first element configuration, to reduce asymmetric engine wear, and to more efficiently deflect debris and/or birds. In the figure, the base of the deflector apparatus 1702 is contiguous with engine 1700, but is able to rotate about the long axis of the engine.

Embodiments of the inventions hereinabove are possible in which:

1) There is more than one distal cable running around the circumference of the device, to impart additional stability;

2) There are two or more cables running in parallel through the transverse/non-distal second elements (one cable illustrated hereinabove);

3) The cable is replaced or supplemented by one or more ribbon shaped elements;

4) There are two tandem deflector apparatuses, each of which has the appearance of all of the protection elements shown in FIG. 11A (or 11B, 1A, 1B, 8A or 8B). In a preferred embodiment of the invention, the first elements of the first apparatus are placed so that debris which passes through the outer apparatus is geometrically unlikely to pass through the second apparatus. The longitudinal first elements of the outer apparatus may have a different angular location than those of the inner apparatus, and/or the transverse elements of the outer apparatus may be situated in a more (or less) distal location than those of the inner apparatus. The outer apparatus may rotate (a) at a different speed than the inner one; and/or (b) in a different direction than the inner one;

5) The arrangement of first elements functions to (a) deflect airborne debris, and/or (b) break up airborne degree into smaller pieces.

6) Embodiments of the invention with other first element retraction and extension mechanism are possible.

7) Embodiments of the invention with other stabilizing mechanisms for the distal end of the first elements are possible.

8) Embodiments of the invention with a device, such as a device for passing electric current through the deflector elements, for maintaining the temperature of the elements above freezing, thereby to prevent formation of ice on the deflector.

There has thus been shown and described novel apparatus and methodology for controlling an implantable medical device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A retractable bird and debris deflector for an aircraft jet engine comprising an air intake duct with a central longitudinal axis and a forward opening for the receipt of air, said forward opening having a perimeter and said deflector comprising, in combination:

(a) a plurality of elongate first support members disposed on the air intake duct of the engine in spaced relation to each other and having leading ends which extend from a perimeter of said forward opening, said first support members being mounted for movement to extend and retract said leading ends; and (b) a second support member, disposed at the forward opening and coupled to the leading ends of said first support members to retain said leading ends in spaced relation, said second support member being extendible in length and configured to hold the leading ends of the first support members sufficiently close together to cause said first support members to deflect at least one of a bird and debris, when in a first, deployed position, and to allow the leading ends of the first support members to maintain a spaced-apart relation along a line which approximately corresponds to the perimeter of the air duct when in a second, retracted position.

2. The bird and debris deflector defined in claim 1, wherein said first support members are mounted for movement in a longitudinal direction substantially parallel to said longitudinal axis.

3. The bird and debris deflector defined in claim 1, wherein said second support member also maintains said leading ends of the first support members in spaced-apart relation when in an intermediate position, between said first and second positions.

4. The bird and debris deflector defined in claim 1, wherein the perimeter of the air duct has a shape selected from the group consisting of a circle, an oval and a polygon.

5. The bird and debris deflector defined in claim 1, wherein the line along which the leading ends of the support members are held forms substantially the same shape in the first position as in the second position.

6. The bird and debris deflector defined in claim 1, further comprising at least one additional second support member which extends substantially transverse to said longitudinal axis and which is located between the leading and trailing ends of said first support members in spaced relation from said second member, for maintaining said first support members in spaced-apart relation.

7. The bird and debris deflector defined in claim 1, wherein said second support member is made of an elastic material.

8. The bird and debris deflector defined in claim 1, wherein said second support member is made of metal and, when in said second position, extends a multiplicity of times around said line in an overlapping relationship.

9. The bird and debris deflector defined in claim 1, wherein said second support member is a flexible cable.

10. The bird and debris deflector defined in claim 9, further comprising a second support member cable take-up mechanism for selectively pulling and releasing said cable forming said second support member.

11. The bird and debris deflector defined in claim 10, wherein said cable take-up mechanism is disposed at the leading ends of said first support members.

12. The bird and debris deflector defined in claim 10, wherein said cable take-up mechanism is disposed on said duct.

13. The bird and debris deflector defined in claim 9, wherein said first support members each include a tube at its leading end which extends substantially transverse to said longitudinal axis, and wherein said cable is passed through each of said tubes.

14. The bird and debris deflector defined in claim 9, wherein said first support members each include a second tube, which extends substantially transverse to said longitudinal axis and which is located between the leading and trailing ends of said first support members, said deflector further comprising a second cable passed through each of said second tubes, wherein said second cable serves as an additional support member.

15. The bird and debris deflector defined in claim 14, further comprising an additional second cable take-up mechanism for selectively pulling and releasing said second cable forming said additional support member.

16. The bird and debris deflector defined in claim 1, wherein said first members each comprise a plurality of elongate elements, nested one inside the other in a telescoping arrangement, and means for extending and retracting a leading end of an innermost elongate element, respectively outward away from, and back toward, the air intake duct.

17. The bird and debris deflector defined in claim 1, wherein said first members each comprise an elongate element having a trailing end disposed within said air intake duct, and means, disposed on said air intake duct, for extending and retracting a leading end of said elongate element.

18. The bird and debris deflector defined in claim 1, wherein said forward opening of said air intake duct is circular and said first support members are disposed around said perimeter in a spaced-apart circular configuration about said longitudinal axis, and wherein said deflector includes means for rotating said first and said second support members together about said longitudinal axis;

thereby to increase the effectiveness of said deflector.

19. The bird and debris deflector defined in claim 1, further comprising means, disposed on said air intake duct, for extending and retracting a leading ends of said first support members, said means being selected from the group of devices consisting of an electric motor, a hydraulic motor and a pneumatic motor.

20. The bird and debris deflector defined in claim 13, further comprising a second support member cable take-up mechanism for selectively pulling and releasing said cable forming said second support member, and wherein at least one of said tubes is T-shaped with a top portion extending substantially transverse to said longitudinal axis and said bottom portion extending substantially parallel to said longitudinal axis, and wherein said cable extends through said bottom portion of said T-shaped tube toward the cable take-up mechanism disposed in said duct.

21. The bird and debris deflector defined in claim 20, wherein said deflector comprises a plurality of said second support member cable take-up mechanisms, each configured for retracting and extending a respective portion of said cable forming said second support member.

22. The bird deflector defined in claim 13, further comprising an electromagnet disposed on each of said tubes for selectively attracting the nearest one of an adjacent tube, thereby to attract the leading ends of said first support members when in said first position.

23. The bird and debris deflector defined in claim 17, wherein said first support members are substantially rigid rods which are movable between said first position and said second position, and wherein the trailing end of each first support member is coupled to said duct by means of a hinge, thereby to form a cone-shaped deflector when in said first position.

24. The bird and debris deflector defined in claim 10, wherein said first support members are formed of flexible cables, and wherein said deflector further comprises at least one first support member cable take-up mechanism, disposed on said duct, for selectively pulling and releasing said cables forming said first support members, whereby said second support member cable take-up mechanism pulls said second support member to draw the leading ends of said first support members together when said at least one first cable take-up mechanism releases said first support members, and vice versa.

25. The bird and debris deflector defined in claim 1, further comprising means for heating said first support members to a temperature above freezing, thereby to prevent the formation of ice on the deflector.

26. The bird and debris deflector defined in claim 24, further comprising a T-shaped tube with a top portion extending substantially transverse to said longitudinal axis and a bottom portion, and wherein said second support member cable extends from the second cable take-up mechanism through said bottom portion of said T-shaped tube and exits through said top portion thereof to connect with and support said first support members.

* * * * *